United States Patent
Koga et al.

[11] Patent Number: 6,033,041
[45] Date of Patent: Mar. 7, 2000

[54] REGENERATIVE BRAKING CONTROL SYSTEM FOR ELECTRIC VEHICLE

[75] Inventors: Hisamitsu Koga; Kazunori Handa; Nobuyuki Kawai; Kenichi Saga; Nobuya Furukawa; Akira Maeda; Tomiji Oowada; Hiroaki Yoshida, all of Tokyo, Japan

[73] Assignee: Mitsubishi Jidosha Kogyo Kabushiki Kaisha, Tokyo, Japan

[21] Appl. No.: 08/836,887

[22] PCT Filed: Sep. 19, 1996

[86] PCT No.: PCT/JP96/02703

§ 371 Date: Aug. 15, 1997

§ 102(e) Date: Aug. 15, 1997

[87] PCT Pub. No.: WO97/10966

PCT Pub. Date: Mar. 27, 1997

[30] Foreign Application Priority Data

Sep. 20, 1995 [JP] Japan .................................. 7-242086
Oct. 3, 1995 [JP] Japan .................................. 7-256653
Apr. 5, 1996 [JP] Japan .................................. 8-083540

[51] Int. Cl.[7] ................................. B60T 8/34; B60L 7/10
[52] U.S. Cl. ...................... 303/152; 303/113.4; 303/192; 188/159
[58] Field of Search ...................... 303/152, 155, 303/113.4, 20, 191, 192; 188/156, 158, 159; 60/414

[56] References Cited

U.S. PATENT DOCUMENTS

| 4,962,969 | 10/1990 | Davis ............................. 303/3 |
| 5,043,896 | 8/1991 | Sol ...................... 364/426.02 |
| 5,132,906 | 7/1992 | Sol et al. ............. 364/426.02 |
| 5,358,317 | 10/1994 | Cikanek .................... 303/100 |

FOREIGN PATENT DOCUMENTS

| 1-127302 U | 8/1989 | Japan . |
| 1-198201 | 8/1989 | Japan ..................... 188/159 |
| 4208004A | 7/1992 | Japan . |
| 58729 | 3/1993 | Japan . |
| 5122805A | 5/1993 | Japan . |
| 6161554A | 6/1994 | Japan . |
| 6217406A | 8/1994 | Japan . |
| 7101271A | 4/1995 | Japan . |
| 7101272A | 4/1995 | Japan . |
| 7105474A | 4/1995 | Japan . |
| 7186993A | 7/1995 | Japan . |

*Primary Examiner*—Mark T. Le
*Assistant Examiner*—Jeffrey Woller

[57] ABSTRACT

A regenerative braking control system for an electric vehicle which can be driven by operating an electric motor with electric energy supplied from an electric energy supply source mounted on the vehicle. A control unit (7) is designed so that regenerative braking force of the electric motor (2) is controlled in accordance with an inclination detected by an inclination detecting unit (28). This has made it possible to provide the electric vehicle with improved drivability and running performance.

20 Claims, 16 Drawing Sheets

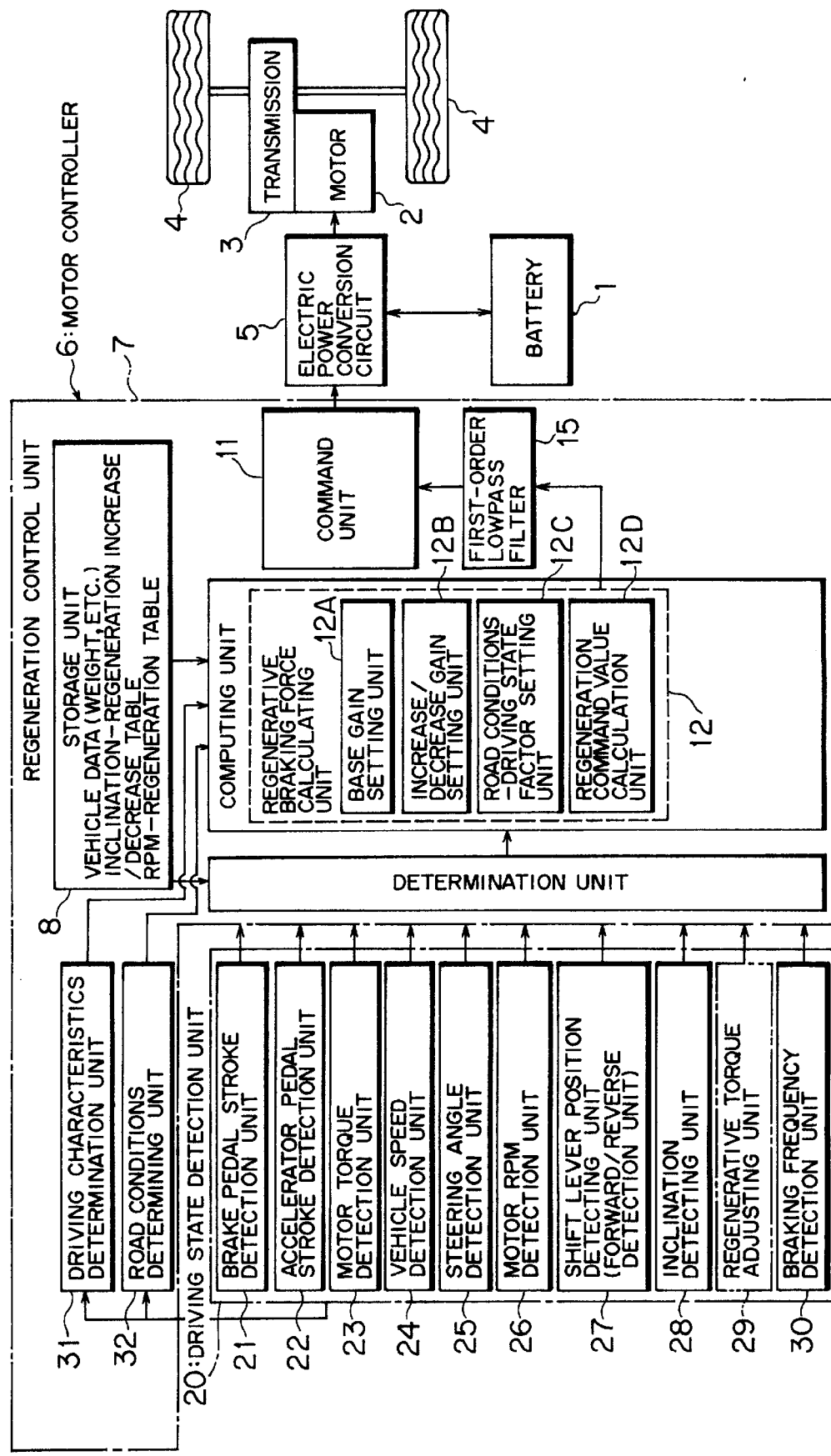

FIG. 9

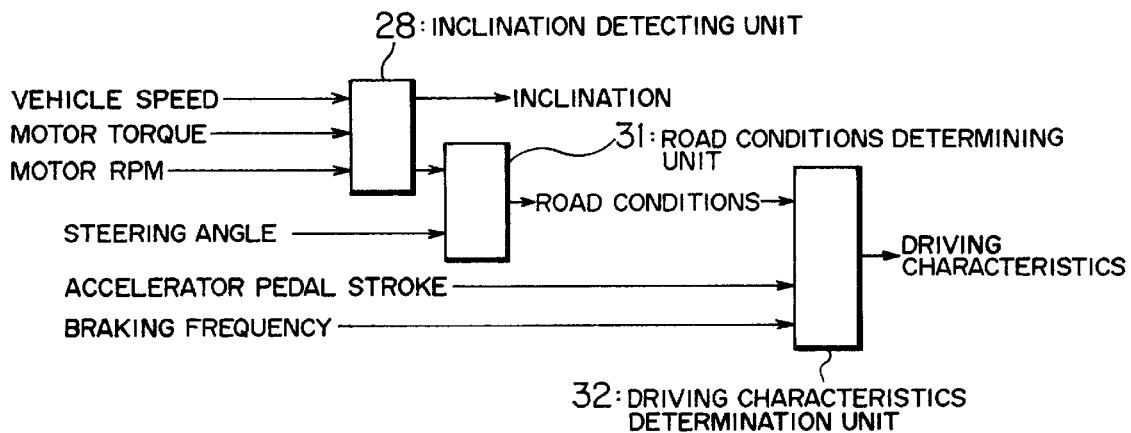

- VEHICLE SPEED → 28: INCLINATION DETECTING UNIT → INCLINATION
- MOTOR TORQUE →
- MOTOR RPM →
- 31: ROAD CONDITIONS DETERMINING UNIT
- STEERING ANGLE → ROAD CONDITIONS →
- ACCELERATOR PEDAL STROKE →
- BRAKING FREQUENCY →
- → DRIVING CHARACTERISTICS
- 32: DRIVING CHARACTERISTICS DETERMINATION UNIT

FIG. 10

EXAMPLES OF ROAD CONDITIONS — DRIVING STATE FACTOR

| | | ROAD CONDITIONS | | | |
|---|---|---|---|---|---|
| | | URBAN DISTRICT | HIGH-SPEED ROAD | MOUNTAIN ROAD | JAMMED ROAD |
| DRIVING STATE | RELAXED | 1.0 | 0.8 | 1.0 | 1.0 |
| | NORMAL | 1.0 | 0.9 | 1.1 | 1.0 |
| | TENSE | 1.1 | 1.0 | 1.2 | 1.0 |

FIG. 14
REGENERATIVE FORCE =
( STANDARD ) x ( ROAD CONDITIONS — DRIVING STATE FACTOR )
REGENERATIVE FORCE =
( STANDARD + INCLINATION ) x ( ROAD CONDITIONS
                                — DRIVING STATE FACTOR )
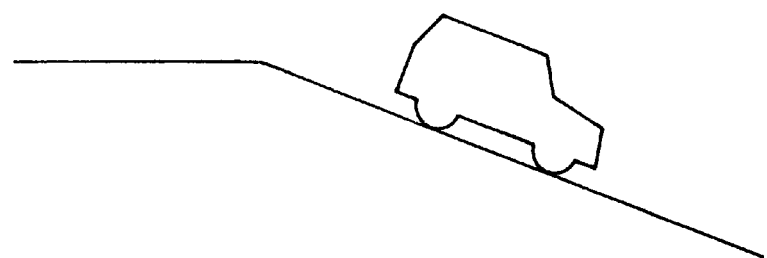

STEERING ANGLE VERSUS
REGENERATION-GAIN-DETERMINING FACTOR

REGENERATIVE BRAKING CONTROL SYSTEM FOR ELECTRIC VEHICLE

TECHNICAL FIELD

This invention relates to an electric vehicle which runs by driving wheels with an electric motor, and especially to a regenerative braking control system for an electric vehicle, which controls regenerative braking by an electric motor in accordance with road conditions and driver characteristics.

BACKGROUND ART

Electric vehicles (electric cars) have been attracting increasing interest in recent years from the viewpoint of prevention of air pollution and reduction of vehicle noise. With these electric cars, so-called regenerative braking can be easily performed. This regenerative braking can be effected by changing over the operation mode of an electric drive motor (hereinafter called the "motor") into an electric power generation mode, whereby rotational energy of the driving wheels is recovered as electric energy through the motor.

Such regenerative braking is generally controlled so that upon depression of a brake pedal or upon release of an accelerator pedal from a depressed position, braking force is produced in association with the depression or release.

When an accelerator pedal is released from a depressed position while a brake pedal is in a non-depressed position, regenerative braking weaker than that exerted when the brake pedal is in a depressed position is performed (this regeneration will be called "moderate regeneration") so that the regenerative brake becomes equivalent to an engine brake in the case of an automotive vehicle driven by an internal combustion engine. If more regenerative braking force than needed is produced at this time, the vehicle speed may, however, drop beyond the driver's desire.

Further, when regenerative braking is performed while driving at a low vehicle speed, such as driving in an urban district, electric power supplied to a motor becomes greater, thereby failing to achieve energy saving.

A technique that makes it possible, by a manual operation, to vary moderate braking force, which is equivalent to an engine brake and applied upon release of an accelerator pedal or a brake pedal in an electric car, has therefore been proposed, for example, in Japanese Patent Application Laid-Open (Kokai) No. HEI 5-122805.

According to the above-mentioned conventional technique of Japanese Patent Application Laid-Open (Kokai) No. HEI 5-122805, however, regenerative braking force is adjusted by a manual operation. While driving on a slope, moderate regeneration may have to be changed frequently in accordance with variations in grade. This imposes an extra burden on the driver.

With the foregoing problem in view, the present invention has as an object to provide of a regenerative braking control system for an electric vehicle, which makes it possible to obtain appropriate regenerative braking force in accordance with conditions of a road, on which the vehicle is running, driver characteristics, and the like without needing frequent manual operations.

DISCLOSURE OF THE INVENTION

A regenerative braking control system according to the present invention for an electric vehicle therefore comprises an electric energy supply source mounted on the vehicle, an electric motor electrically connected to the electric energy supply source and having a power output shaft connected to a driving wheel of the vehicle, a driving state detection unit including an inclination detecting unit for detecting an inclination of the vehicle when running, and a control unit for controlling regenerative braking force of the electric motor on a basis of detection information from the inclination detecting unit of the driving state detection unit.

Owing to the above constitution, regenerative braking force corresponding to an inclination can be automatically produced so that appropriate regenerative braking force can be obtained without any particular operation.

BRIEF DESCRIPTION OF THE DRAWINGS

FIG. 8 is a functional block diagram focusing on essential functions of a regenerative braking control system according to a second embodiment of the present invention for an electric car;

FIG. 9 is a block diagram depicting an essential constitution for an inclination-dependent correction and a road-conditions-and-driving-state-dependent correction by the regenerative braking control system according to the second embodiment of the present invention for the electric car;

FIG. 10 is a diagram illustrating details of increase/decrease gains for the road conditions and driving state for a road-conditions-and-driving-state-dependent correction by the regenerative braking control system according to the second embodiment of the present invention for the electric car;

FIG. 14 is a diagram describing an operation of the regenerative braking control system according to the second embodiment of the present invention for the electric car;

BEST MODE FOR CARRYING OUT THE INVENTION

Based on the drawings, a description will hereinafter be made about the embodiments of the regenerative braking control system according to the present invention for the electric vehicle.

(a) Description of the first embodiment

First, the first embodiment of the present invention will be described with reference to the drawings.

Figure 1:
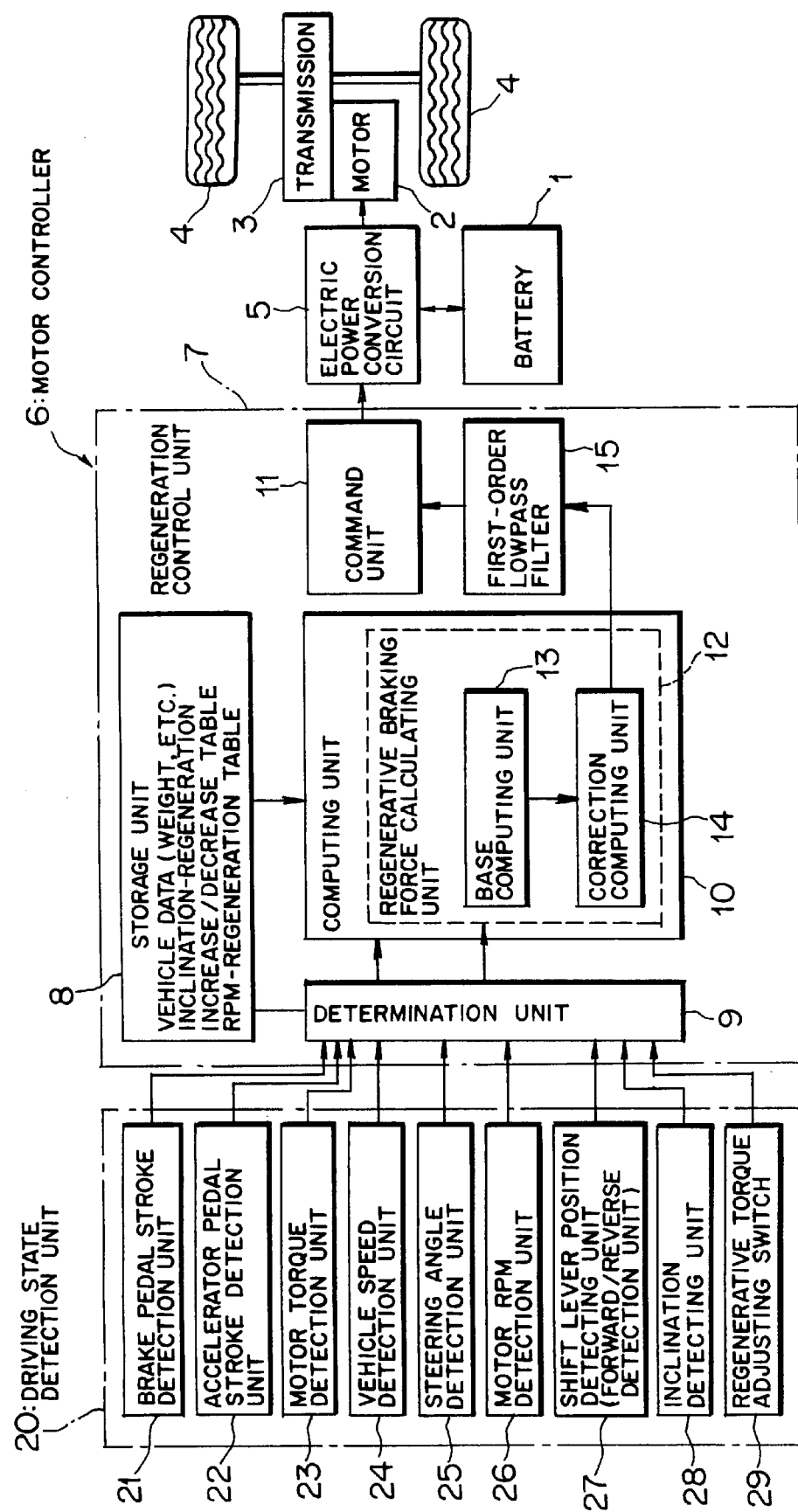
FIG. 1 is a functional block diagram focusing on essential functions of a regenerative braking control system according to a first embodiment of the present invention for an electric car.

In the regenerative braking control system according to the first embodiment for the electric vehicle, numeral 1 designates a battery as an electric energy supply source as shown in FIG. 1. This battery 1 can be repeatedly charged by an external battery charger which the vehicle is not equipped with. Designated at numeral 2 is an electric motor (electric drive motor) which is supplied with electric power from the battery 1, and driving wheels 4 are drivenly connected to a power output shaft of the motor 2 via a transmission 3. Arranged between the battery 1 and the motor 2 is an electric power conversion circuit 5 so that electric power from the battery 1 is adjusted to a desired level through the electric power conversion circuit 5 and is then supplied to the motor 2.

Further, the electric power conversion circuit 5 is controlled through a motor controller 6. According to this motor controller 6, a power output of the motor 2 is controlled corresponding to a stroke of an unillustrated accelerator pedal through the electric power conversion circuit 5. The motor controller 6 is internally provided with a regeneration control unit (controller) 7.

At this regeneration control unit 7, the state of regenerative braking is controlled. Regenerative braking itself means, as is well known, braking in which the operation mode of the electric drive motor 2 is changed over into an electric power generation mode, kinetic energy of the driving wheels 4 is recovered and the battery 1 is then charged using the kinetic energy as electric energy.

To control such regenerative braking, the regeneration control unit 7 is provided with a storage unit 8, a determination unit 9, a computing unit 10, and a command unit 11.

Connected to the regeneration control unit 7 is a driving state detection unit 20, which includes a brake pedal stroke detection unit 21 (which may be a brake switch) as a brake operation detection unit, an accelerator pedal stroke detection unit 22 (which may be an accelerator switch), a motor torque detection unit 23, a vehicle speed detection unit (vehicle-speed sensor) 24, a steering angle detection unit (steering angle sensor) 25, a motor rpm detection unit (rpm detection unit) 26, a shift lever position detecting unit (forward/reverse detection unit) 27, an inclination detecting unit 28, and a regenerative torque adjusting switch 29, whereby information on driving and operation states—such as brake operation information, accelerator operation information, motor torque information, vehicle speed information, steering angle information, motor rpm information, vehicle forward/reverse information, road grade information, and regenerative torque adjustment information—is inputted. Incidentally, the regenerative torque adjusting switch 29 is a manually-operated member which makes it possible to adjust the strength of regenerative braking by the driver's manual operation.

Stored in the above-mentioned storage unit 8 are, for example, various vehicle data—such as weights W,WO, a frontal projected area S of the vehicle, a rolling resistance coefficient $\mu r$, drag coefficient $\mu c$, transmission gear ratio nt and final drive gear ratio nf—and an inclination-regeneration increase/decrease table (or map), a rpm-regeneration table (or map), a table (or map) concerning cornering resistances Rc, and the like. These tables (or maps) will be described subsequently herein.

The determination unit 9 performs a determination with respect to regenerative braking on a basis of various information from the operation state detecting unit 20. From shift position information from the shift position detecting unit 27, for example, the determination unit 9 determines whether the vehicle is in an advancing state or in a reversing state. Further, the computing unit 10 performs computation to control regenerative braking. This computing unit 10 is provided with a regenerative braking force calculation unit (or computing unit) 12.

This regenerative braking force calculation unit 12 is provided with a base gain computing unit 13 for computing a base gain with respect to the base regenerative braking force on a basis of detection information from the brake operation detecting unit 21 and the rpm detection unit 26 and also with a correction computing unit 14 for correcting the base regenerative braking force, which has been computed by the base gain computing unit 13, in accordance with an increase/decrease gain corresponding to an inclination of the running vehicle. The regenerative braking force calculation unit 12 multiplies the regenerative braking force (regenerative torque), which corresponds to the strength of regenerative braking instructed through the regenerative torque adjusting switch 29, by the regeneration gain calculated by the base gain computing unit 13 and the correction computing unit 14, whereby regenerative braking force (regenerative torque) is obtained.

Namely, this regenerative braking force calculation unit 12 sets a regeneration gain equivalent to an engine brake as will be indicated by the following equation:

Engine-brake-equivalent regeneration gain=base gain+increase/decrease gain

Figure 2:
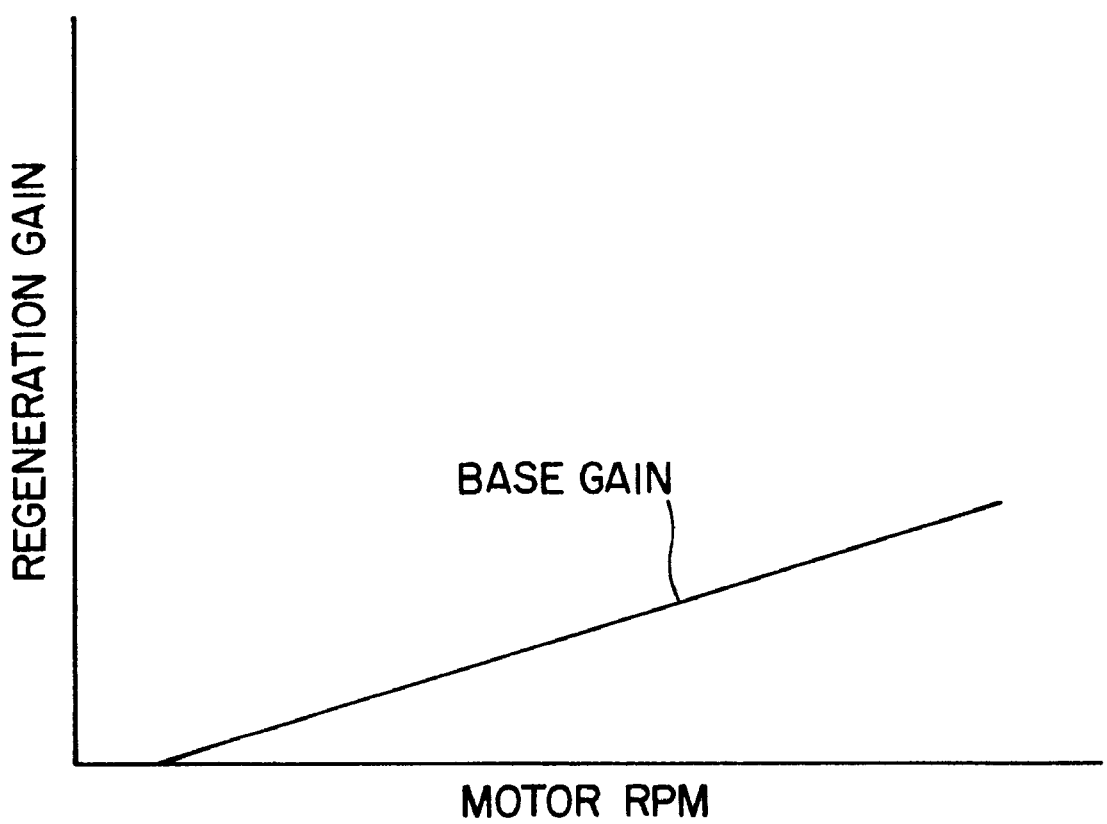
FIG. 2 is a diagram showing characteristics of base gains for setting base regenerative braking force by the regenerative braking control system according to the first embodiment of the present invention for the electric car.

Among these parameters, the base gain is set so that, when moderate regeneration is performed without operation of a brake, for example, the base gain is proportional to the rpm (revolution speed) of the motor 2 as is shown in FIG. 2. Specifically, an rpm-regeneration table or map of such characteristics as shown in FIG. 2 is stored in the storage unit 8 and based on this table or map, a base gain is calculated from an rpm of the motor 2.

Figure 3:
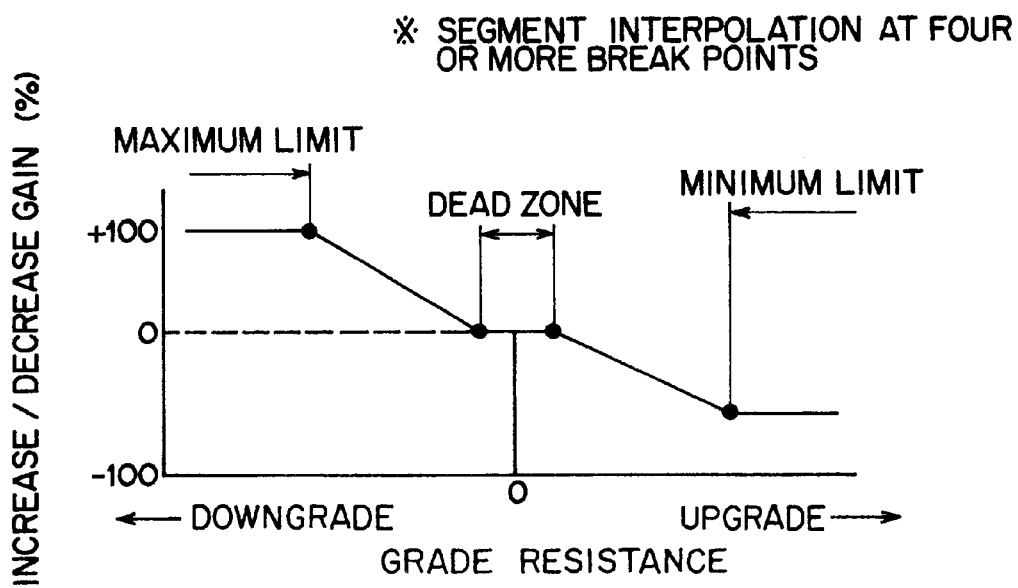
FIG. 3 is a diagram illustrating characteristics of increase/decrease gains for the correction of base regenerative braking force by the regenerative braking control system according to the first embodiment of the present invention for the electric car.
Figure 4:
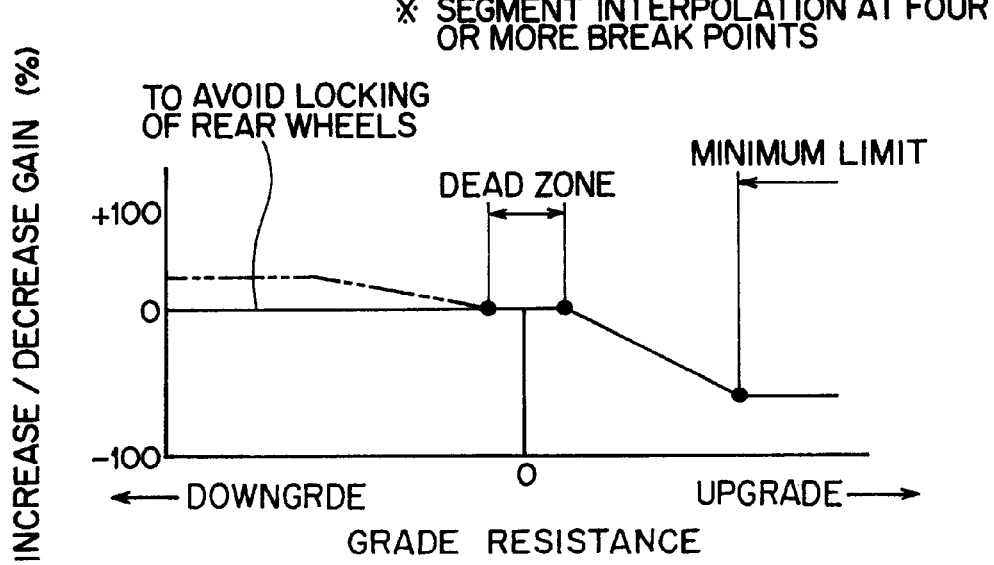
FIG. 4 is a diagram illustrating characteristics of increase/decrease gains for the correction of base regenerative braking force by the regenerative braking control system according to the first embodiment of the present invention for the electric car.

Further, the increase/decrease gain is set corresponding to the grade (grade resistance) of a road as shown in FIG. 3 or FIG. 4. The setting characteristics shown in FIG. 3 can be applied to all vehicles equipped with ABS (antilock brake system). Concerning vehicles equipped with no ABS, these setting characteristics can be applied to those having driving wheels on a frontal side relative to an advancing direction. In other words, these setting characteristics can be applied when a front wheel drive vehicle is moving forward or a rear wheel drive vehicle is moving backward.

On the other hand, the setting characteristics illustrated in FIG. 4 can be applied to automotive vehicles equipped with no ABS and having driving wheels on a rear side relative to the advancing direction. Namely, the setting characteristics illustrated in FIG. 4 can be applied both when a front wheel drive vehicle is moving backward and when a rear wheel drive vehicle is moving forward. According to the setting characteristics shown in FIG. 3, the increase/decrease gain is set on a decrease side (namely, at a decrease gain) in the case of an ascent hill (i.e., the grade resistance is positive), and the magnitude of the decrease gain increases as the degree of the upgrade becomes greater. On the other hand, the increase/decrease gain is set on an increase side (namely, at an increase gain) in the case of a descent hill (i.e., the grade resistance is negative), and the magnitude of the increase gain increases as the degree of the upgrade becomes greater.

However, a dead zone is provided in a range around a grade resistance of 0 (namely, for a level road and roads having grades close to that of the level road) so that the stabilization of control is assured. Further, a minimum limit and a maximum limit are also imposed on the increase/decrease gain. When the degree of the upgrade becomes greater than a predetermined value, the increase/decrease gain is set to the minimum limit, in other words, the magnitude of the decrease gain takes a maximum value (=−100%). When the degree of the downgrade becomes greater than a predetermined value, on the other hand, the increase/decrease gain is set to the maximum limit, in other words, the magnitude of the increase gain takes a maximum value (=100%). Practically feasible control can therefore be performed.

According to the setting characteristics illustrated in FIG. 4, the increase/decrease gain is set on a decrease side (namely, at a decrease gain) in the case of an ascent hill (i.e., the grade resistance is positive), and the magnitude of the decrease gain increases as the degree of the upgrade becomes greater. In the case of a descent hill (i.e.., the grade resistance is negative), on the other hand, the increase/decrease gain is held at 0% as in the case of a level road. It is for the following reasons that in the case of a descent hill, the increase/decrease gain is set at 0% to effect no correction as described above.

Figure 5:
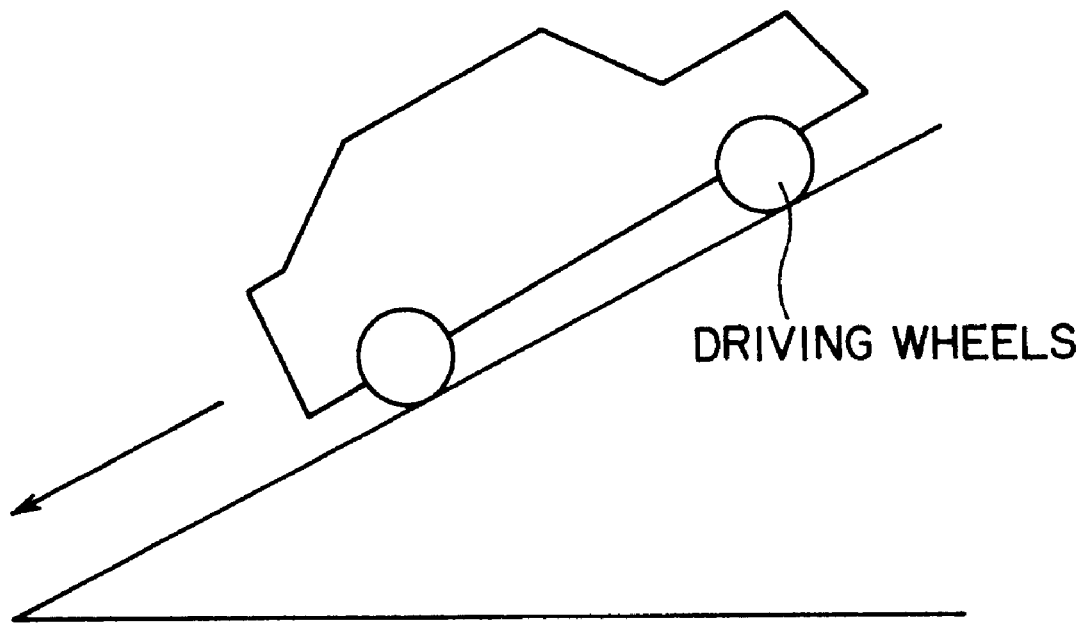
FIG. 5 is a diagram illustrating an explanation of characteristics of increase/decrease gains for the correction of base regenerative braking force by the regenerative braking control system according to the first embodiment of the present invention for the electric car.

Regenerative braking force is applied to driving wheels. When a front wheel drive vehicle is moving backward on a descent hill or a rear wheel drive vehicle is moving forward on a descent hill as shown in FIG. 5, its driving wheels are located on an upper side of the hill so that regenerative braking force is applied to the upper wheels on the hill. As the upper wheels on the hill bear less vehicle weight, an increase in regenerative braking force involves a potential danger that the wheels could be locked. Accordingly, when driving wheels, to which regenerative braking force is applied, are located on an upper side of a hill, the increase/decrease gain is held at 0% to inhibit any increasing correction.

In an ABS-equipped vehicle, the ABS itself acts to prevent locking of wheels. It is therefore unnecessary to set the increase/decrease gain at 0 as described above. The increase/decrease gain is therefore set as shown in FIG. 3. Even for such increase/decrease gains, inclination-increase/decrease regeneration tables or maps of such characteristics, as shown in FIG. 3 and FIG. 4, are stored in the storage unit 8 and based on one of the tables or maps, an increase/decrease gain is calculated from an inclination. It is also possible to set an increase/decrease gain for a grade resistance by using segment interpolation on the basis of particular 4 or more points (break points) in FIG. 3 or FIG. 4.

At the regenerative braking force calculation unit 12, the base gain and the increase/decrease gain, which have been set from the motor rpm and the grade resistance as described above, are added to calculate a regeneration gain, and the regenerative braking force (regenerative torque) preset based on information from the regenerative torque adjusting switch 29 or the like is multiplied by the regeneration gain, thereby obtaining new regenerative braking force (regenerative torque). The regenerative braking force (regenerative torque), which has been calculated at the regenerative braking force calculation unit 12 of the computing unit 8 as described above, is then fed to the command unit 11 via a first-order lowpass filter 15 as a device for inhibiting any abrupt change in a preset value of regenerative braking force. Owing to the arrangement of the first-order lowpass filter 15, the regenerative braking force (regenerative torque) is prevented from an abrupt change so that the control of regeneration can be performed without incongruousness.

A description will now be made with respect to the detection of a grade. According to the inclination detecting unit 28 in this embodiment, a grade is estimated by conducting computation on the basis of an equilibrium of force components concerning running of a vehicle. Specifically, during running of the vehicle, an equation of force equilibrium can be established as will described hereinafter.

$$F=Ra+R \tag{1.1}$$

where

F: tire driving force or tire braking force transmitted through a tire,

Ra: acceleration resistance, and

R: running resistance.

Of these parameters, the tire driving force or tie braking force F can be calculated based on a motor torque (which can be computed from a current command value) as shown by the following equations:

Tire driving force F=Tm×gear ratio×gear efficiency÷dynamic loaded tire radius

Tire braking force F=Tm'×gear ratio×gear efficiency÷dynamic loaded tire radius+Br (1.2)

where

Tm: power running torque of the motor (computed from a current command value),

Tm': regenerative torque of the motor (computed from a current command value), and Br: mechanical braking torque.

On the other hand, the running resistance R is expressed by R (θ, V) as a function of a road surface inclination θ and a vehicle speed V, and this running resistance R(θ,V) is expressed by the following equation.

$$R(\theta,V)=W(\mu r \cdot \cos\theta \cdot \sin\theta)\cdot \mu c \cdot S \cdot V^2 + Rc \quad (1.3)$$

where

W: gross vehicle weight,

S: frontal projected area of the vehicle,

μr: rolling resistance coefficient,

μc: drag coefficient, and

Rc: cornering resistance.

Storage of values, which correspond to steering angles, in the form of a table on the basis of real-car data makes it possible to determine the cornering resistance Rc on the basis of a steering angle (steering wheel angle), which is detected by the steering angle sensor 25, with reference to the table.

Further, the acceleration resistance Ra can be calculated based on a vehicle acceleration a as shown by the following equation:

$$Ra=(W+\Delta W)\cdot a/g$$

$$\Delta W=WO\{Ec+Fc(nt \cdot nf)^2\}$$

$$Ec=g \cdot Iw/(r^2 \cdot WO)$$

$$Fc=g \cdot Im/(r^2 \cdot WO) \quad (1.4)$$

where

WO: empty vehicle weight, a: vehicle acceleration, g: gravitational acceleration [=9.8 (m/s²)], nt: transmission gear ratio, nf: final drive gear ratio, r: dynamic loaded tire radius, Iw: moment of inertia of rotating tire part, and Im: moment of inertia of rotating motor part.

The rotating tire part includes a tire, a brake drum, an axle shaft and the like, while the rotating motor part includes a motor rotor, a flywheel, a clutch and the like.

In addition, the vehicle acceleration a can be determined by the following equation:

$$a=\Delta[(\text{revolution speed of motor+gear ratio})\times 2\pi\text{tire radius}]/\Delta t \quad (1.5)$$

Incidentally, the unit of the revolution speed of the motor is [revolutions/second], the unit of the tire radius is [meter], and the unit of Δt is [second].

Further, when a revolution speed of the motor is expressed in terms of [rpm] unit, namely, motor revolutions per minute, the following equation can be obtained:

Revolution speed of motor=motor revolutions÷60

Introducing the equation (1.3) into the formula (1.1), the following equation can be derived:

$$W \cdot \sin\theta \approx F - Ra - W\mu c - \mu c \cdot S \cdot V^2 - Rc \quad (1.6)$$

From these equations, a grade resistance W·sinθ or a grade θ can be calculated from motor torques Tm,Tm' determined from a current command value to the motor 2, a vehicle acceleration a determined from a detection value or the like of the motor rpm sensor 26, and a cornering resistance Rc which can be determined based on a steering angle detected by the steering angle sensor 25.

Now, a front wheel drive vehicle equipped with no ABS is taken as an example. According to the regenerative braking control system of this embodiment for the electric vehicle, the determination of regenerative braking force or regenerative torque in regeneration control is performed at predetermined intervals as shown in the flow chart of FIG. 6.

Figure 6:
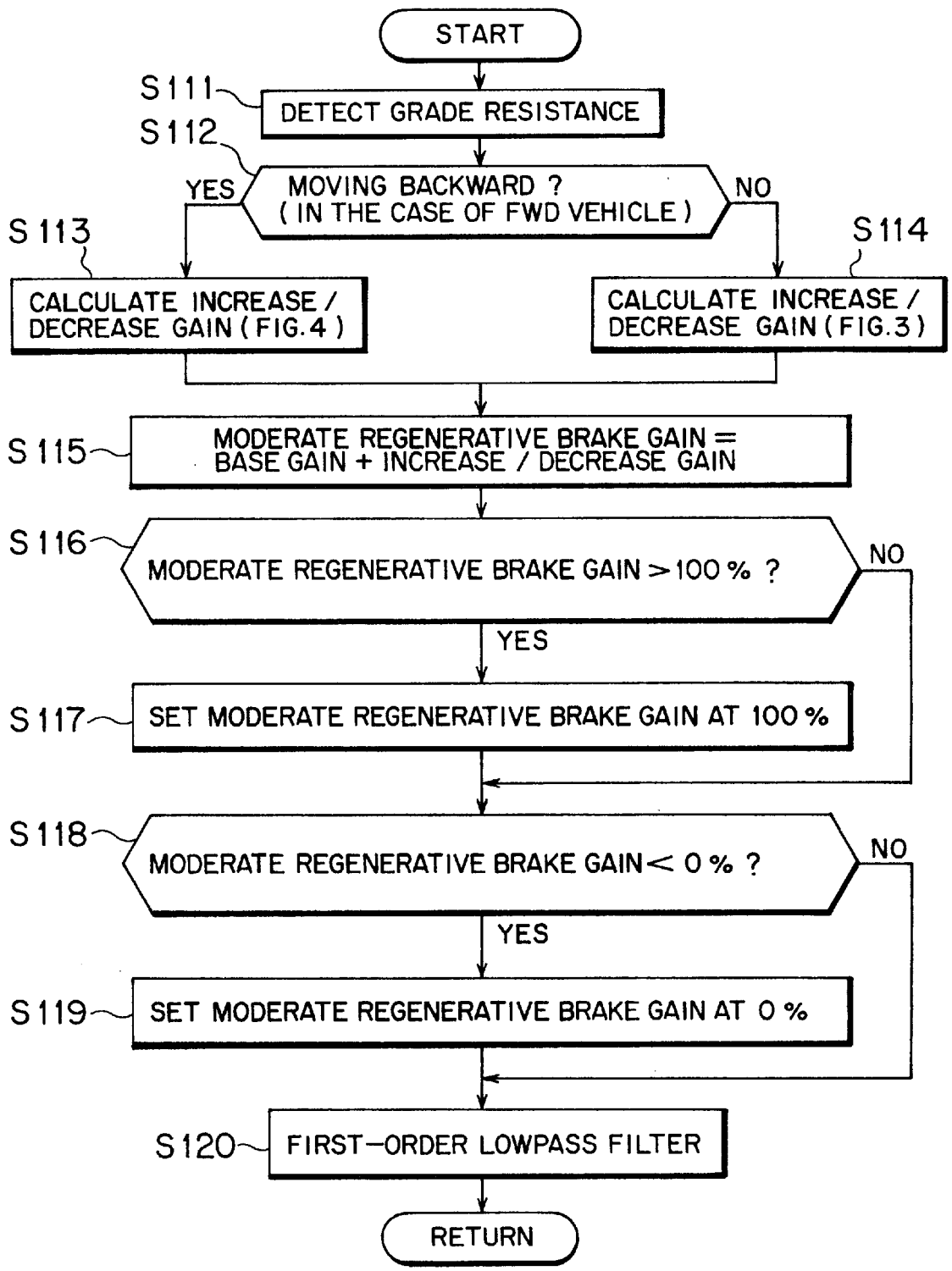
FIG. 6 is a flow chart for describing an operation of the regenerative braking control system according to the first embodiment of the present invention for the electric car.

Describing specifically, as is illustrated in FIG. 6, upon detection of grade resistance by the inclination detecting unit 28 in step S111, it is then determined in step S112 by the determination unit 9 on the basis of information from the shift lever position detecting unit 27 whether a vehicle is moving backward. If the vehicle is found to be moving backward by this determination, the regenerative braking force calculation unit 12 performs calculation of an increase/decrease gain in step S113 on the basis of the characteristics shown in FIG. 4.

When the calculation of the increase/decrease gain is performed based on the characteristics of FIG. 4 as described above, an increase in the degree of upgrade leads to a corresponding increase in the magnitude of a decrease gain. In the case of an ascent hill, as the grade becomes greater, the vehicle tends to be more decelerated due to gravity and the need for regenerative braking force is reduced accordingly. When the decrease in regeneration gain is with the increase in upgrade as described above, the vehicle is allowed to run backward.

In the case of a descent hill, the increase/decrease gain is set at 0 so that regenerative braking force is maintained at a level similar to that applied on a level road. Even when the driving wheels (regeneratively braked wheels) are located on an upper side of the descent hill, bear less weight and have a potential danger of locking by an increase in braking force, the above setting of the increase/decrease gain can avoid an increase in the regenerative braking force, that is, locking of the wheels, leading to an advantage that the running stability of the vehicle can be maintained.

As the increase/degrease gain is set at 0 in the gentle grade range around that of a level road, there is another advantage that regenerative braking force can be stably obtained without incongruousness.

If the vehicle is not moving backward, on the other hand, calculation of an increase/decrease gain is performed by the regenerative braking force calculation unit 12 in step S114 on the basis of the characteristics shown in FIG. 3. When the increase/decrease gain is calculated based on the characteristics of FIG. 3 in this manner, an increase in the degree of upgrade leads to a corresponding increase in the magnitude of a decrease gain. In the case of an ascent hill, as the grade becomes greater, the vehicle tends to be more decelerated due to gravity and the need for regenerative braking force is reduced accordingly. When the decrease in regeneration gain is increased with the increase in upgrade as described above, production of excessive regenerative braking force can be avoided so that the vehicle is allowed to smoothly run on the ascent hill without incongruousness.

On the other hand, an increase in the degree of downgrade leads to a corresponding increase in the magnitude of an increase gain. In the case of a descent hill, as the grade becomes greater, the vehicle tends to be more accelerated due to gravity and the need for regenerative braking force becomes higher accordingly. When the increase in regeneration gain is increased with the increase in downgrade as described above, regenerative braking force is increased as needed so that the vehicle is allowed to smoothly run on the descent hill without incongruousness.

As the increase/degrease gain is of course set at 0 in the gentle grade range around that of a level road, there is a further advantage that regenerative braking force can be stably obtained without incongruousness.

Subsequent to the determination of the increase/decrease gain as described above, the regenerative braking force calculation unit 12, in step S115, adds the increase/decrease gain to a base gain and calculates an engine-brake-equivalent regeneration gain (moderate regeneration gain).

An output from the regenerative braking force calculation unit 12 is processed through the first-order lowpass filter 15. Owing to the first-order lowpass filter 15, the regenerative braking force (regenerative torque) is prevented from abruptly changing so that in step S116 and onwards, the control of regeneration can be performed without incongruousness.

Described specifically, it is determined in step S116 whether or not the moderate regeneration gain is greater than 100%. If the moderate regeneration gain is greater than 100%, the routine advances to step S117 and the moderate regeneration gain is set at 100% again.

Further, it is determined in step S118 whether or not the moderate regeneration gain is smaller than 0%. If the moderate regeneration gain is smaller than 0%, the routine advances to step S119 and the moderate regeneration gain is set at 0% again.

After subjection to such processing, the moderate regeneration gain is processed through the first-order lowpass filter 15 in step S120.

According to the system of this embodiment, the engine-brake-equivalent moderate regenerative braking force becomes stronger automatically when the accelerator is released in the course of running on a descent hill. It is therefore possible to reduce the frequency of operations of the brake pedal and that of operations of the regenerative torque adjusting switch by the driver and owing to an improvement in the efficiency of regeneration, also to increase the distance covetable per charging.

When the accelerator is released in the course of running on an ascent hill, the engine-brake-equivalent moderate regenerative braking force becomes weaker automatically. Accordingly, it is also possible to reduce the frequency of operations of the brake pedal and that of operations of the regenerative torque adjusting switch by the driver and owing to an improvement in the efficiency of regeneration, also to increase the distance covetable per charging.

Further, both while moving backward on a descent hill in the case of a front wheel drive vehicle and while moving forward on a descent hill in the case of a rear wheel drive vehicle, it is possible to prevent the regenerative braking force from increasing upon release of the accelerator. Locking of the rear wheels relative to the running direction (i.e., the driving wheels in each case) can be prevented, leading to a still further advantage that the steering ability of the vehicle can be assured.

Incidentally, it may be contemplated to set, as shown by the chain line in FIG. 4, the increase/ lo decrease gain for a time that a front wheel drive vehicle is moving backward on a descent hill or a rear wheel drive vehicle is moving forward on a descent hill. Namely, when the accelerator is released while running on such a descent hill, the moderate regenerative braking force is increased less than those in other cases (see FIG. 3), thereby making it possible to avoid locking of the rear wheels (i.e., the driving wheels in each case) relative to the running direction although the moderate regenerative braking force often required upon release of the accelerator while running on the descent hill is made somewhat stronger automatically. Of course, it is preferred for such by setting first taking the prevention of locking of the wheels into consideration and then considering increasing the regenerative braking force.

In such regenerative braking, as the grade becomes greater in the case of an ascent hill, the vehicle tends to be more decelerated due to gravity and the need for regenerative braking force is reduced accordingly. As the upgrade becomes greater, the decrease in the regeneration gain is therefore increased to avoid production of excessive regenerative braking force. As the grade becomes greater in the case of a descent hill, on the other hand, the vehicle tends to be more accelerated due to gravity and the need for regenerative braking force is increased accordingly. As the upgrade becomes greater, the increase in the regeneration gain is therefore increased so that the regenerative braking force can be increased as needed. By the way, the friction resistance of tires is low on a road surface which is wet with rain or snow. Accordingly, an abrupt increase in regenerative braking force may result in locking of the tires or an abrupt depression of the accelerator pedal may lead to slipping of the tires. It is therefore necessary to consider increasing or decreasing the regenerative braking force on such a low $\mu$-road.

Figure 7:
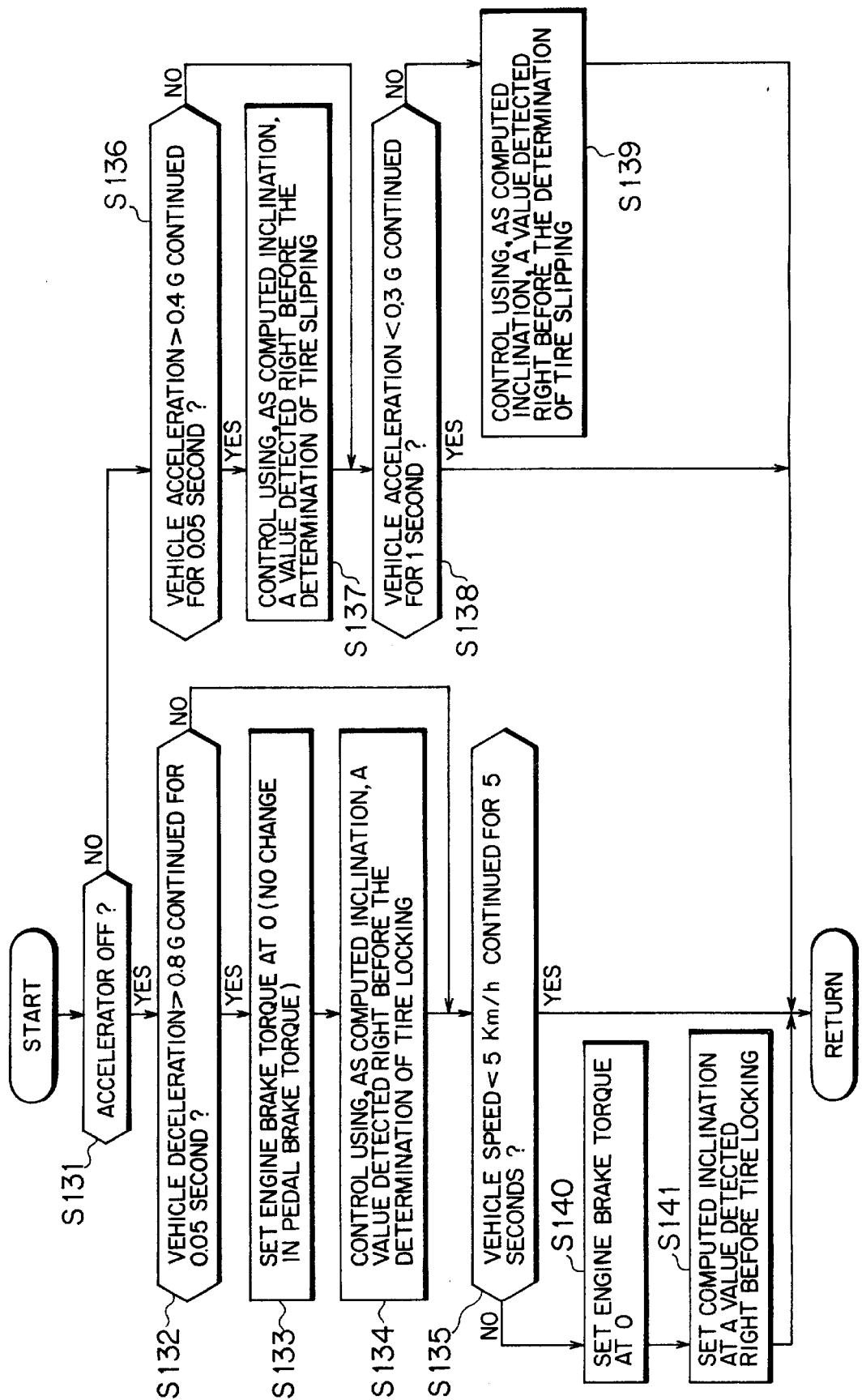
FIG. 7 is a flow chart for describing an operation of a modification of the regenerative braking control system according to the first embodiment of the present invention for the electric car.

Reference is hence made to FIG. 7, which is a flow chart illustrating operation of regeneration control which takes such road conditions into consideration. A description will now be made about this flow chart. In step S131, it is determined whether or not the accelerator is off. If the accelerator is off, the routine advances to step S132. If accelerator is on, the routine advances to step S136. Various controls are then performed. Namely, it is determined in step S132 whether or not a deceleration of the vehicle is greater than a preset deceleration limit value, i.e., 0.8 G in this embodiment and this decelerated state has continued for at least a predetermined limit period, i.e., for 0.05 second in this embodiment. If so, it is determined that the vehicle is on a descent hill and the tires are in a locked state. In this case, the regenerative braking force of the motor 2 is set at 0 in step S133, and in step 134, control is performed using, as a grade resistance detected by the inclination detecting unit 28, a grade resistance detected right before the deceleration of the vehicle exceeded 0.8 G, that is, before the tires were brought into the locked state. In this manner, when the tires are brought into a locked state by regenerative braking force of the motor 2 on a low $\mu$-road of a downgrade, the regenerative braking force is changed to 0 to release the tires from the locked state. The driver can therefore control the vehicle by depressing the foot brake.

It is then determined in step S135 that, if the vehicle speed is not higher than a preset threshold value, i.e., 5 km/h in this embodiment and this state has continued for a predetermined threshold period, i.e., 5 seconds in this embodiment, the locked state of the tires has been released and the vehicle is in a substantially stopped state. Like the above-described embodiment, control is thus performed using a detection resistance from the inclination detecting unit 28.

On the other hand, if the conditions that the vehicle speed is not higher than the threshold value (5 km/h) and this state has continued for the predetermined threshold period (5 seconds) are not found to be met in step S135, the routine advances to step S140 to set the regenerative braking force of the motor 2 to 0, and in step S141, a value of grade resistance detected right before the deceleration of the vehicle exceeded 0.8 G, that is, before the tires were brought into the locked state is set as a grade resistance detected by the inclination detecting unit 28. The routine then returns.

If the accelerator is found to be on in step S131, on the other hand, it is determined in step S136 whether or not the acceleration of the vehicle is greater than a preset acceleration limit value, i.e., 0.4 G in this embodiment and this accelerated state has continued for a predetermined limit period, i.e., 0.05 second. If so, it is determined that the vehicle is on an ascent hill and the tires are in a slipping state. In this case, control is performed in step S137 by using, as a grade resistance detected by the inclination detecting unit 28, a grade resistance detected right before the acceleration of the vehicle exceeded 0.4 G, that is, before the tires were brought into the slipping state. In this manner, when the tires are brought into a slipping state by a depression of the accelerator pedal on a low $\mu$-road of an upgrade, the control is performed by changing the regenerative braking force to the strength before the slipping, whereby the vehicle can be controlled.

After that, if an acceleration is not found to be higher than a preset acceleration threshold value, i.e., 0.3 G in this embodiment and this state is found to have continued for at least a predetermined threshold period, i.e., 1 second in this embodiment, the tires are determined in a state released from the slipping state, and the routine then returns.

If the tires are not found to have been released from the slipping state in step S138, the routine advances to step S139, where control is performed using, as a grade resistance detected by the inclination detecting unit 28, a value of grade resistance detected right before the acceleration of the vehicle exceeded 0.4 G, that is, before the tires were brought into the slipping state. The routine then returns.

In this embodiment, each deceleration or acceleration of the vehicle is determined from an rpm of the motor 2 detected by the motor rpm detection unit 26. As an alternative, each driving wheel 4 may be provided with a wheel speed sensor. In this embodiment, the control was performed by setting the regenerative braking force of the motor 2 to 0 in step S133 so that the tires were released from the locked state. In step S133, the regenerative braking force may, however, be set to reduce the regenerative braking force to such an extent that the driving wheels can be released from a locked state.

(b) Description of the second embodiment

With reference to the drawings, a description will next be made with respect to the second embodiment of the present invention.

Functions of essential elements in the system according to the second embodiment will be described first. As is depicted in FIG. 8, the essential elements of the system are constructed similarly as in the first embodiment. In the second embodiment, the elements of similar constructions as the corresponding elements in the first embodiment will be identified by like symbols, and their detailed description is omitted herein.

In the second embodiment, the operation state detection unit 20 described in the first embodiment is additionally provided with a braking frequency detection unit 30, and the regeneration control unit (controller) 7 also described in the first embodiment is further provided with a road conditions determining unit 31 and a driving characteristics determination unit 32. Further, the regenerative braking force calculation unit 12 arranged within the computing unit 10 is provided with a road conditions-driving state factor setting unit 12C and a regeneration command value calculation unit 12D in addition to a base gain setting unit 12A and an increase/decrease gain setting unit 12B.

A description will first be made of the regenerative braking force calculation unit 12. The base gain setting unit 12A sets a base gain on the basis of detection information from the brake pedal stroke detection unit 21 and the motor rpm detection unit 26. The increase/decrease gain setting unit 12B sets an increase/decrease gain corresponding to an inclination of the running vehicle. The road conditions-driving state factor setting unit 12C sets a road conditions-driving state factor in accordance with road conditions and driving characteristics. The regeneration command value calculation unit 12D calculates a regeneration command value (a regeneration control amount for giving desired regenerative braking force) on the basis of the base gain, the increase/decrease gain and the road conditions-driving state factor set by the respective setting units 12A,12B,12C.

Further, the regenerative braking force calculation unit 12 sets an engine-brake-equivalent regeneration gain (hereinafter called a "moderate regeneration gain" or simply a "regeneration gain") as indicated by the following equation:

$$\text{Moderate regeneration gain} = (\text{base gain} + \text{increase/decrease gain}) \times \text{road conditions-driving state factor} \quad (2.1)$$

Among these parameters, the base gain set by the base gain setting unit 12A and the increase/decrease gain set by the increase/decrease gain setting unit 12B are set in a similar manner as in the above-described first embodiment: At the base gain setting unit 12A, a base gain is calculated from a map such as that shown in FIG. 2 with respect to the first embodiment and at the increase/decrease gain setting unit 12B, an increase/decrease gain is set corresponding to a grade of a road (grade resistance) by using the maps illustrated in FIG. 3 and FIG. 4 in connection with the first embodiment.

A description will next be made with respect to the road conditions-driving state factor set by the road conditions-driving state factor setting unit 12C. As is shown in FIG. 8 and FIG. 9, at the road conditions-driving state factor setting unit 12C, a road conditions-driving state factor such as that shown in FIG. 10 is set in accordance with road conditions and driving characteristics set based on various driving state data from the motor torque detection unit 23, the vehicle speed detection unit (vehicle speed sensor) 24, the steering angle detection unit (steering angle sensor) 25, and the motor rpm detection unit (rotation detecting means) 26, which are all arranged within the driving state detection unit 20.

As road conditions, the road conditions determining unit 31 to be described subsequently herein determines, based on a vehicle speed, a motor torque, a motor rpm, and a steering angle, the kind of a road on which the vehicle is running, that is, which one of an urban district, a high-speed road, a mountain road and a jammed road the vehicle is running in or on. As driving characteristics, on the other hand, the driving characteristics determination unit 32 to be described subsequently herein determines whether the driving characteristics of the driver are relaxed or tense or in-between (normal).

Depending on the road conditions and driving characteristics determined as described above, the road conditions-driving state factor is set as shown in FIG. 10. Specifically, when the driving characteristics are relaxed, the road conditions-driving state factor is set slightly smaller so that the degree of regeneration tends to be weakened. When the driving characteristics are tense, on the other hand, the factor is set slightly greater so that the degree of regeneration tends to be strengthened. When the driving characteristics are normal, the factor is set between the former factor and the latter factor. Further, on a high-speed road, the factor is set smaller so that the degree of regeneration tends to be weakened. On a jammed road, the factor is not changed so that the degree of regeneration remains in an intermediate state. In an urban district, the factor is set slightly greater so that the degree of regeneration tends to be somewhat strengthened. On a mountain road, the factor is set greater so that the degree of regeneration tends to be strengthened.

Figure 11:
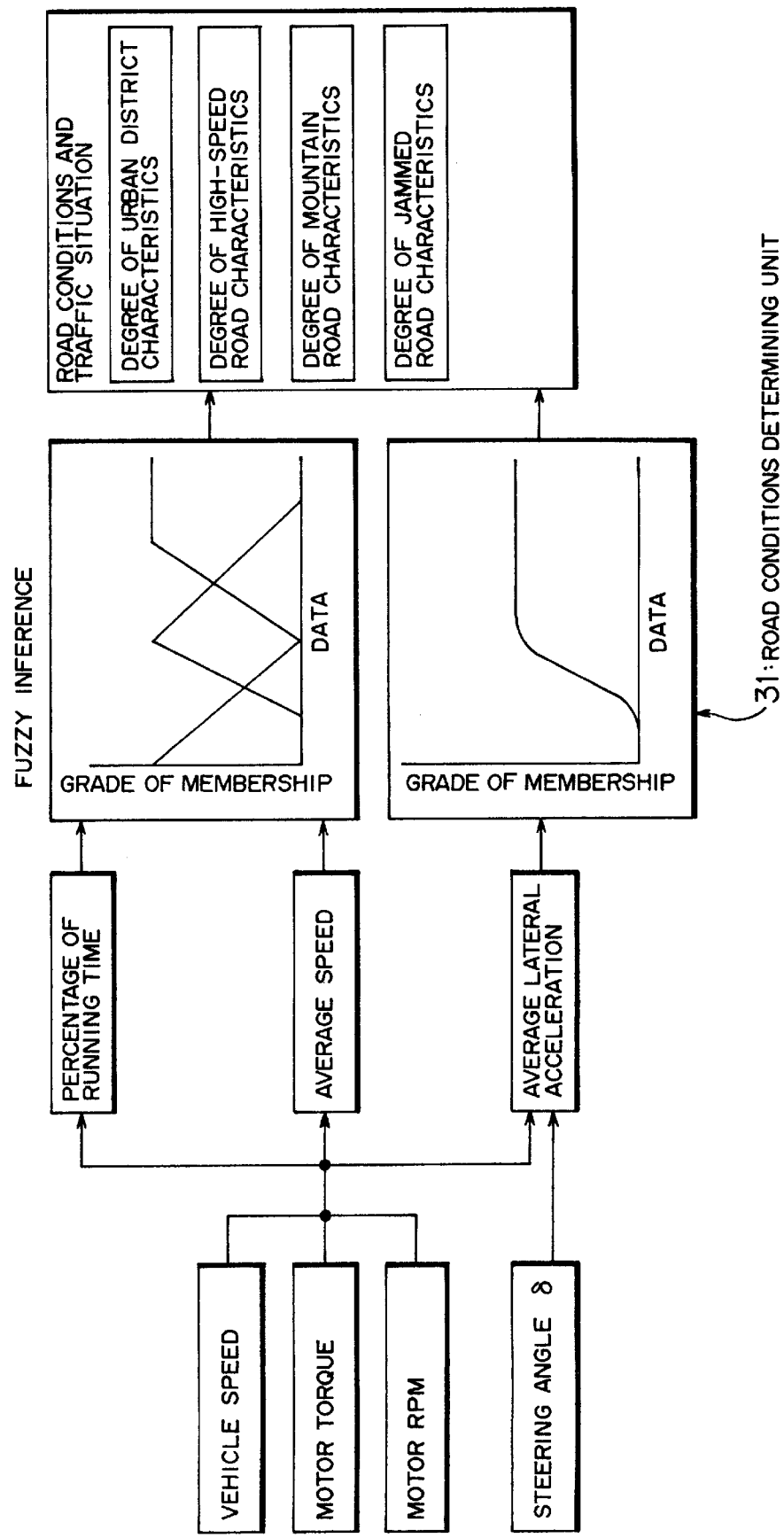
FIG. 11 is a block diagram showing a road conditions determining unit for a driving-state-dependent correction by the regenerative braking control system according to the second embodiment of the present invention for the electric car.

Now describing the road conditions determining unit 31 and the driving characteristics determination unit 31 in detail, the above-mentioned road conditions determining unit (road conditions and traffic situation estimating unit) 31 performs determination of conditions of a road on which the vehicle is running (estimation of road conditions and traffic situation) on the basis of a vehicle speed, motor torque or motor rpm and a steering angle as shown in FIG. 9. Specifically, this determination of road conditions is performed as illustrated in FIG. 11.

Namely, from a vehicle speed VB and a steering angle δ, parameters indicating a running state of the vehicle, for example, a proportion of running time, an average speed and an average lateral acceleration are determined. At this time, a motor torque and a motor rpm may be detected together with the vehicle speed, and based on their detection values or based on the vehicle speed, the motor torque and the motor rpm, these parameters may be determined respectively.

Among these parameters, the average speed and average lateral acceleration are common values and are calculated by known methods. On the other hand, the term "proportion of running time" means the proportion [=Td/(Td+Ts)] of a running time Td in a total time Tall of the running time Td and the stopped time Ts (=Td+Ts). A proportion of running time is calculated by counting a stopped time Ts if the vehicle speed VB is not higher than a predetermined value (for example, 10 km/h) when an ignition switch is turned on or by counting a running time Td if the vehicle speed VB is higher than the predetermined value (for example, 10 km/h) when the ignition switch is turned on.

Based on these proportion of running time, average speed and average lateral acceleration, the degree of urban district characteristics, the degree of high-speed road characteristics, the degree of mountain road characteristics and the degree of jammed road characteristics is estimated. In this embodiment, a fuzzy inference is used for this estimation. In the case of an urban district, for example, there are characteristics that the average speed is low and the proportion of running time is intermediate. In the case of a high-speed road, there are characteristics that the average speed is high, the proportion of running time is large, and the integral of lateral acceleration is low. In the case of a mountain road, there are characteristics that the proportion of running time is small and the integral of lateral acceleration is large. In the case of a jammed road, there are characteristics that the average speed is low and the proportion of running time is small. By setting a membership function and a fuzzy rule on the basis of such characteristics, it is possible to estimate the degree of urban district characteristics, the degree of high-speed road characteristics, the degree of mountain road characteristics and the degree Of jammed road characteristics, respectively.

As current road conditions, the road conditions determining unit 31 determines the district or road, the degree of characteristics of which is the highest among the degree of urban district characteristics, the degree of high-speed road characteristics, the degree of mountain road characteristics and the degree of jammed road characteristics.

At the above-mentioned driving characteristics determination unit 32, the driving characteristics of the driver are determined based on road conditions determined by the road conditions determining unit 31, an accelerator pedal stroke detected by the accelerator pedal stroke detection unit 22 and a braking frequency (i.e., the frequency of braking operations) detected by the braking frequency detection unit 30 as illustrated in FIG. 8 and FIG. 9. At the braking frequency determination unit 30, a braking frequency can be determined by multiplying the number of braking operations and/or the brake-operated period, which has been found by the brake pedal stroke detection unit 21, a brake switch or the like, with a running time.

Incidentally, the term "driving characteristics of the driver" as used herein is defined as will be described next. Namely, a degree of relaxed driving or a degree of tense driving—which indicates whether a driver prefers, for example, relaxed running featuring gentle accelerations and decelerations and a relatively constant speed (such running will be called "relaxed running") or tense running featuring quick accelerations and decelerations and a relatively high speed (such running will be called "tense running")—is used as the driving characteristics of the driver. Such driving characteristics can be estimated based on physical quantities which indicate a driving state of the vehicle.

Figure 12:
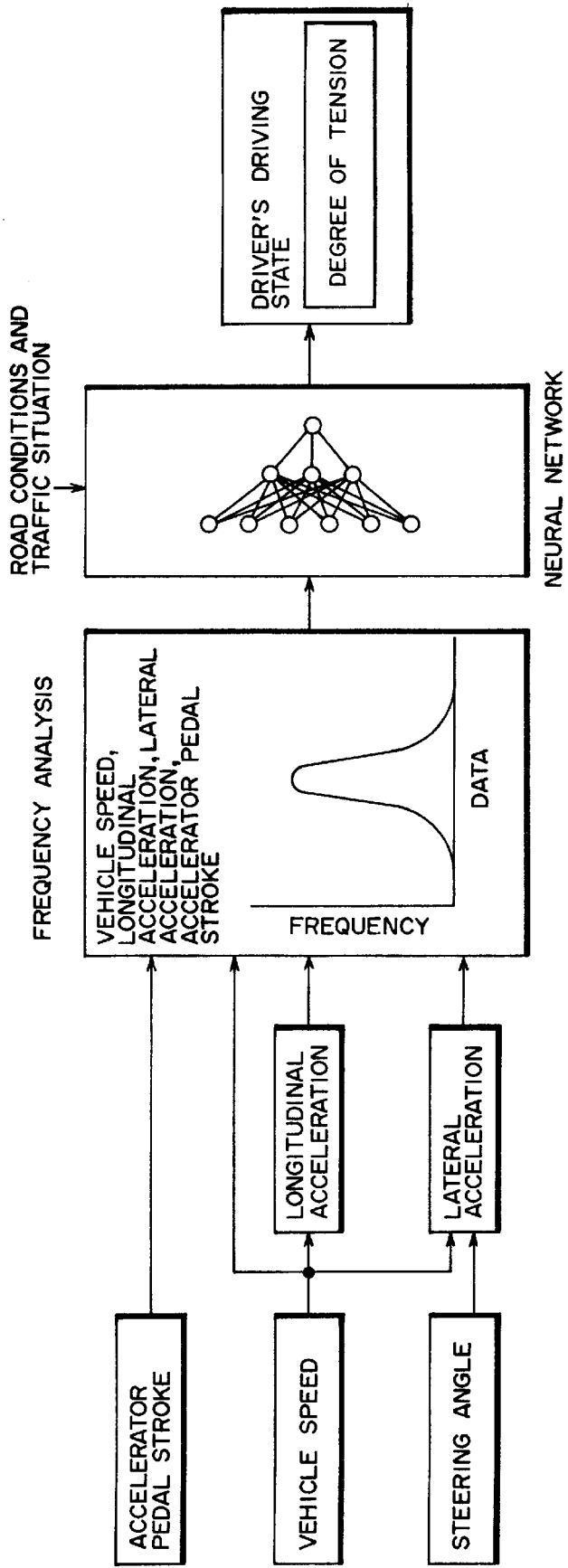
FIG. 12 is a block diagram showing a driving characteristics determination unit for a driving-state-dependent correction by the regenerative braking control system according to the second embodiment of the present invention for the electric car.

However, the driving characteristics of the driver vary depending on the traffic situation of the road on which the vehicle is running. Taking into consideration the road conditions determined by the road conditions determining unit 31 as described above, the driving characteristics determining unit 32 therefore determines the driving characteristics of the driver on the basis of the road conditions and the above-described physical quantities indicating the driving state of the vehicle [namely, an accelerator pedal stroke, a vehicle speed, a longitudinal acceleration available by calculation from the vehicle speed, and a lateral acceleration available by calculation from the vehicle speed and the steering angle (steering wheel angle)] as illustrated in FIG. 12.

Described specifically, with respect to each of the physical quantities (accelerator pedal stroke, vehicle speed, longitudinal acceleration, and lateral acceleration) indicating a driving state of the vehicle, frequency analysis is performed by a known statistical method to calculate the average value and dispersion of each physical quantity.

Based on these average values and dispersions of the individual physical quantities and the road conditions and traffic situation determined from the estimated degrees of urban district characteristics, jammed road characteristics and mountain road characteristics, the driving characteristics of the driver can be estimated from a correlation between average values and dispersions of the individual physical quantities, said average values and dispersions being characterized for individual road conditions, and driving characteristics of drivers.

In this embodiment, a neural network is used for the estimation of the driving characteristics. Namely, the average value and dispersion of each physical quantity become higher with the tension of the driving of the driver, whereas the average value and dispersion of each physical quantity become lower with the relaxation of the driving of the driver. Of course, depending on each road conditions, a different standard is used for the evaluation of driving characteristics.

The neural network is therefore formed so that the correlation between the average values and dispersions of the individual physical quantities, which correspond to the respective road conditions, and the driving characteristics of drivers is expressed as an associative model.

The average values and dispersions of the individual physical quantities as well as the road conditions and traffic situation, determined from the estimated degrees of urban district characteristics, jammed road characteristics and mountain road characteristics, are inputted to the neural network to determine the driving characteristics (the degree of relaxation or the degree of tension) of the driver.

It is of course designed to perform this estimation of the driving characteristics by always inputting latest data as the individual physical quantities and road conditions so that, even when the driving characteristics of the driver change, the thus-changed driving characteristics can be estimated promptly. Therefore, the degree of relaxation or the degree of tension obtained by the driving characteristics determination unit represents an adequate estimation of the characteristics of the driver during actual driving.

The driving characteristics determination means 32 determines the driving characteristics of each driver by ranking them into three stages of relaxed driving characteristics, normal driving characteristics, and tense driving characteristics.

After determinations are performed at the road conditions determining unit 31 and the driving characteristics determination unit 32, respectively, as described above, the road conditions-driving state factor setting unit 12C can set, based on the results of the determination, a road condition-driving state factor corresponding to the road conditions and the driving characteristics from a table such as that illustrated in FIG. 10.

As indicated by the equation (2.1), the regeneration command value calculation unit 12D of the regenerative braking force calculation unit 12 calculates a regeneration gain by adding a base gain and an increase/decrease gain, which have been set from a motor rpm and a grade resistance, together and then multiplies the regeneration gain by the road conditions-driving state factor for the road conditions and driving characteristics, whereby a final target regeneration gain, that is, target regenerative braking force (regeneration command value) can be obtained.

Incidentally, where the regenerative torque adjusting switch 29 is arranged, the target regeneration gain obtained in accordance with the above-mentioned equation (2.1) is multiplied by a gain preset by the switch, so that a final target regeneration gain (target regenerative braking force or regeneration command value) is obtained.

The regenerative braking force (regenerative torque), which has been calculated by the regenerative braking force calculation unit 12 of the computing unit lo as described above, is then fed to the command unit 11 through the first-order lowpass filter 15. As a consequence, the regenerative braking force (regenerative torque) is prevented from changing abruptly owing to the provision of the first-order lowpass filter 15, thereby making it possible to perform regeneration control without incongruousness.

In this embodiment, a grade is estimated by computation on the basis of balancing of force components relating to running of the vehicle in a similar manner as in the above-described first embodiment. A detailed description of this feature is omitted herein.

Figure 13:
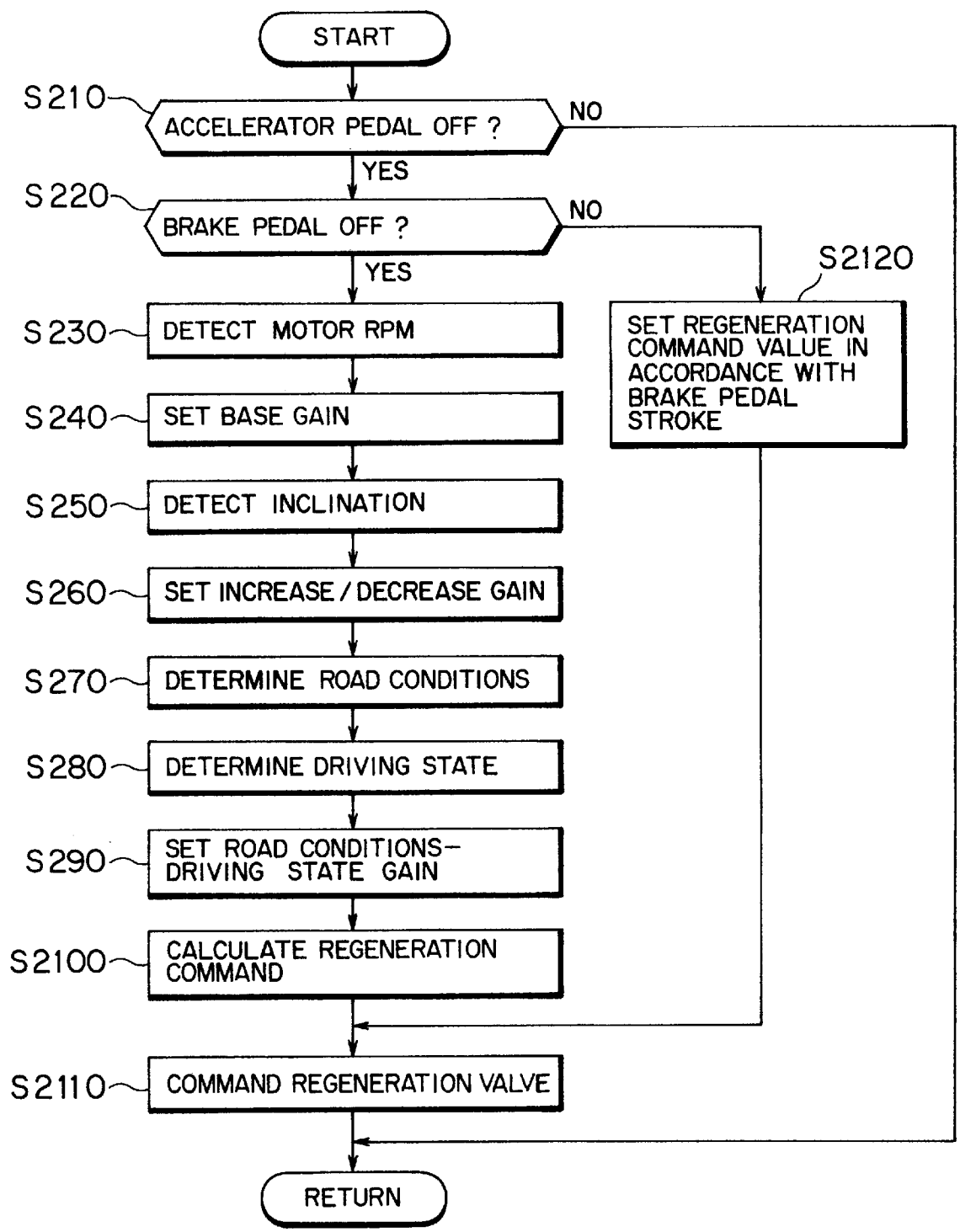
FIG. 13 is a flow chart illustrating a controlling operation of regeneration by the regenerative braking control system according to the second embodiment of the present invention for the electric car.

Since the regenerative braking control system according to the second embodiment of this invention for the electric vehicle is constructed as described above, control of regenerative braking force (regeneration command value) in regeneration control, for example, of a front wheel drive vehicle equipped with no ABS is performed at predetermined intervals as illustrated in the flow chart of FIG. 13.

Described specifically, it is determined in step S210 whether or not the accelerator pedal is off. If the accelerator pedal is on, no regeneration control is performed. If the accelerator pedal is off, however, it is then determined in step S220 whether or not the brake pedal is off. If the brake pedal is on, a regeneration command value is set corresponding to the stroke of the brake pedal (brake pedal stroke) (step S2120). If the brake pedal is off, on the other hand, the routine advances to step S230 onwards so that control of moderate regenerative braking equivalent to an engine brake is performed.

Namely, a motor rpm is first detected in step S230 and the routine then advances to step S240, where a base gain is set by the base gain setting unit 12A on the basis of the motor rpm (see FIG. 2 of the first embodiment). In step S250, a grade is then detected by the inclination detecting unit 28 as described above. The routine thereafter advances to step S260, where based on the grade, an increase/decrease gain is set by the increase/decrease gain setting unit 12B (see FIG. 3 and FIG. 4 of the first embodiment).

Road conditions are then determined by the road conditions determining unit 31 (step S270) and driving characteristics are determined by the driving characteristics determination unit 32 (step S280). The routine then advances to step S290, where based on the results of these determinations, a road conditions-driving state factor is set by the road conditions-driving state factor setting unit 12C (see FIG. 10).

In step S2100, as indicated by the above-described equation (2.1), the regeneration command value calculation unit 12D calculates a regeneration gain by adding the base gain and the increase/decrease gain, which have been set from the motor rpm and the grade resistance, together and then multiplies the regeneration gain by the road conditions-driving state factor for the road conditions and driving characteristics, whereby a final target regeneration gain is obtained and target regenerative braking force (regeneration command value) is set.

After that, a regeneration command is performed in step S2110 so that actual regeneration control is performed.

Incidentally, where the regenerative torque adjusting switch 29 is arranged, the target regeneration gain obtained in accordance with the above-mentioned equation (2.1) is multiplied by a gain preset by the switch, so that a final target regeneration gain is obtained.

As has been described above, the regeneration command is performed in accordance with the regeneration command value set in step S2100 or S2120.

As a result, as is illustrated in FIG. 14, the regenerative braking force can meet not only a requirement from the grade of the road but also a requirement from the road conditions and the preference and driving characteristics of the driver.

In an urban district, for example, the speed is low with large variations in acceleration. For a driver who performs tense driving, the regenerative braking force is strengthened so that significant variations in acceleration can be adequately dealt with.

On a high-speed road, the speed is high with small variations in acceleration. For a driver who performs relaxed driving, the regenerative braking force is weakened at a greater rate, and for a driver who performs normal driving, the regenerative braking force is weakened at a smaller rate.

Smooth regenerative braking conforming with such small variations in acceleration can therefore be performed.

On a mountain road, the speed is somewhat high with extremely large variations in acceleration. For a driver who performs tense driving, the regenerative braking force is strengthened at a greater rate and for a driver who performs normal driving, the regenerative braking force is strengthened at a smaller rate. Irrespective of the characteristics of a driver, it is therefore possible to cope with large variations in acceleration.

On a jammed road, the average speed is low and the proportion of running time is small. Smooth regenerative braking is therefore performed under standard regenerative braking force.

Of course, the control of the regenerative braking force according to such road conditions and driving characteristics is performed while taking an inclination into consideration. It is therefore possible to achieve regenerative braking under appropriate regenerative brake force that reflects the inclination, the road conditions and driving characteristics.

Because the calculation of the increase/decrease gain is conducted based on such characteristics as illustrated in FIG. 4, the magnitude of the decrease gain increases as the grade of the ascent hill becomes greater. On the ascent hill, as the grade increases, it becomes easier for the vehicle to decelerate for gravity so that the need for regenerative braking force is reduced correspondingly. When the decrease in the regeneration gain is increased with the grade of the ascent hill as described above, production of excessive regenerative braking force can be avoided so that the vehicle is allowed to smoothly run on the ascent hill without incongruousness.

In the case of a downgrade, the increase/decrease gain is set to 0 so that the regenerative braking force is maintained at a level similar to that for a level road. Even when the driving wheels (regeneratively-braked wheels) are located on an upper side of a slope and bear less vehicle weight and an increase in braking force has a potential danger of inducing locking, the above setting of the increase/decrease gain can avoid an increase in regenerative braking force and hence induction of wheel locking, leading to an advantage that the running stability of the vehicle can be maintained.

In the gentle grade range around the grade of a level road, the increase/decrease gain is set at 0. This brings about an advantage that incongruousness-free regenerative braking force can be stably obtained.

When the calculation of the increase/decrease gain is conduced based on the characteristics of FIG. 3, the magnitude of the decrease gain increases correspondingly with the degree of the upgrade as described above. On an ascent hill, as the grade increases, it becomes easier for the vehicle to decelerate for gravity so that the need for regenerative braking force is reduced correspondingly. When the decrease in the regeneration gain is increased with the grade of the ascent hill as described above, production of excessive regenerative braking force can be avoided so that the vehicle is allowed to smoothly run on the ascent hill without incongruousness.

Further, as the degree of the downgrade becomes greater, the magnitude of the increase gain increases correspondingly. As the grade becomes greater in the case of a descent hill, the vehicle is more easily accelerated for gravity and the need for regenerative braking force is increased accordingly. If the increase of the regenerative gain is increased with the magnitude of the downgrade, the regenerative braking force is increased as needed so that the vehicle is allowed to smoothly run on the descent hill without incongruousness.

Of course, in the gentle grade range around the grade of a level road, the increase/decrease gain is set to 0. This also brings about an advantage that incongruousness-free regenerative braking force can be stably obtained.

By controlling the regeneration gain as described above, it is possible to reduce the frequency of operations of an accelerator and/or a brake, to improve the efficiency of regeneration, and also to increase the distance covetable per charging of the electric car.

Further, the processing of an output from the regenerative braking force calculation unit 12 through the first-order lowpass filter 15 prevents an abrupt change of regenerative braking force (regenerative torque) so that the control of regeneration can be performed without incongruousness.

(c) Description of the third embodiment

The third embodiment of the present invention will next be described with reference to the drawings.

This third embodiment is different in the manner of setting of a regeneration gain from the above-described first and second embodiments. Except for this differences, the third embodiment is constructed like the first and second embodiments. In the third embodiment, elements constructed as in the first and second embodiments will be identified by like symbols, and their detailed description is omitted herein.

Figure 15:
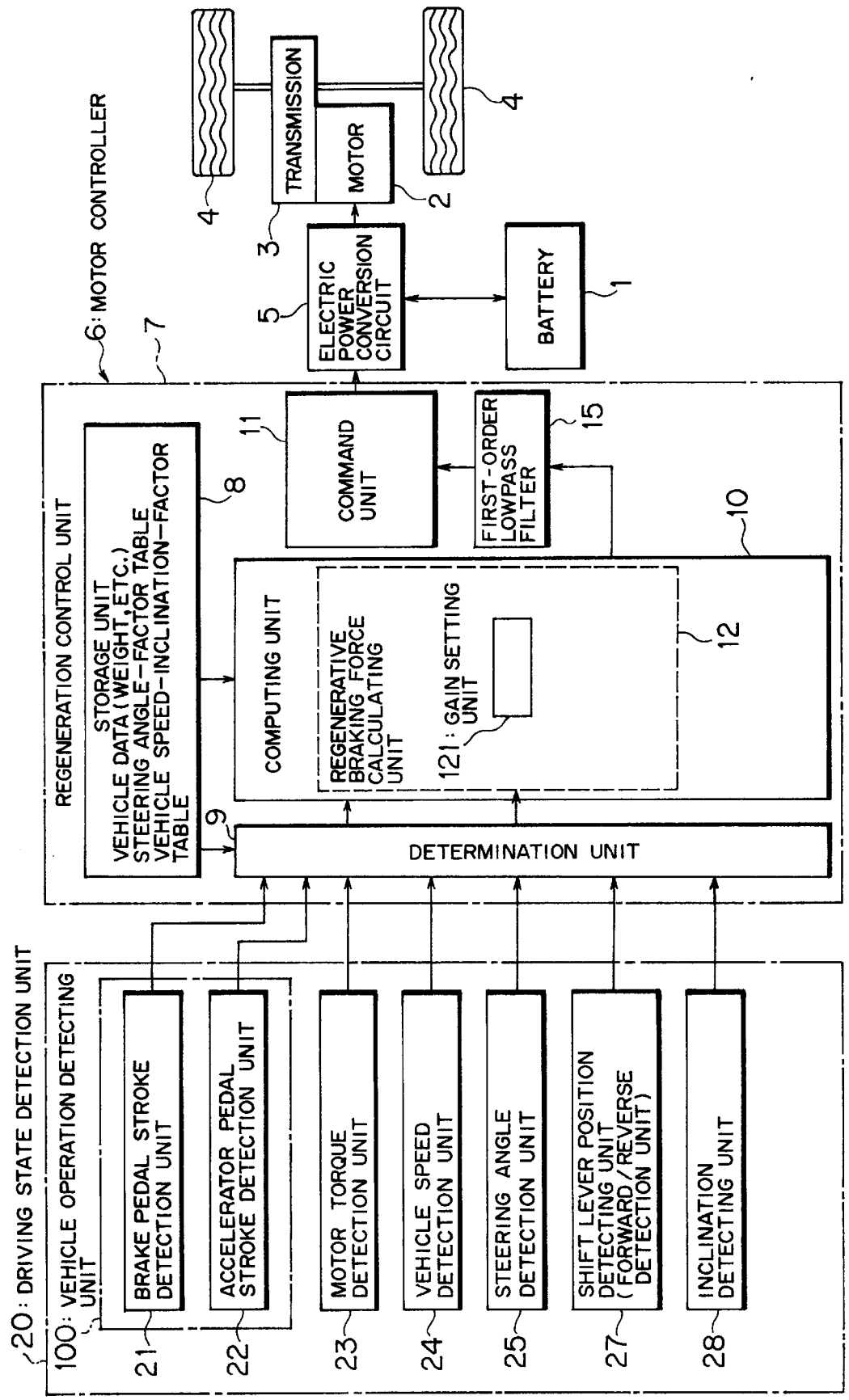
FIG. 15 is a functional block diagram focusing on essential functions of a regenerative braking control system according to a third embodiment of the present invention for an electric car.

In this third embodiment, the driving state detection unit 20 is provided, as shown in FIG. 15, with a vehicle operation detecting unit 100, the vehicle speed detection unit (vehicle speed sensor) 24, the steering angle detection unit (steering angle sensor) 25 as a cornering state detection unit, the inclination detecting unit 28 and the like.

Incidentally, the vehicle operation detection unit 100 is composed of the brake pedal stroke detection unit (brake operation detection unit) 21 and the accelerator pedal stroke detection unit 22.

Further, the control unit 7 is provided with the regenerative braking force calculation unit 12. Arranged within this regenerative braking force calculation unit 12 is a gain setting unit 121. The gain setting unit 121 sets a regeneration gain K in moderate regenerative braking equivalent to an engine brake on the basis of various information of a vehicle speed, a grade and a steering angle detected from the vehicle speed sensor 24, the steering angle sensor 25 and the inclination detecting unit 28. Incidentally, the detection of the grade is conducted by a similar method as that employed in the above-described first and second embodiments.

As will be indicated below by the equation (3.1), the regeneration gain K is calculated as a product of two factors, Ka (first factor) and Kaθ (second factor).

$$K = Ka \cdot Ka\theta \qquad (3.1)$$

Figure 16:
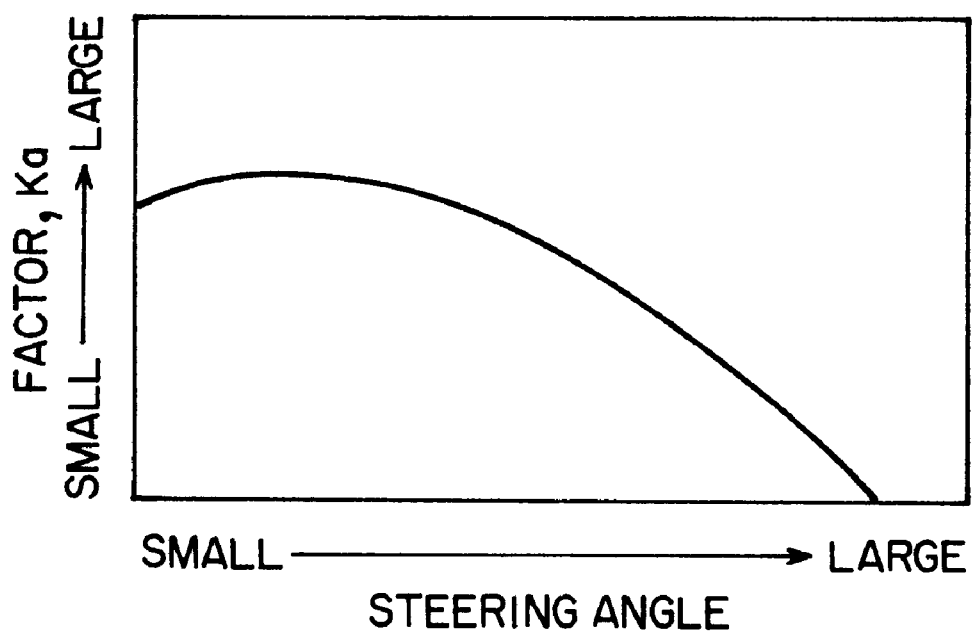
FIG. 16 is a diagram illustrating characteristics of factors for setting regeneration gains of the regenerative braking control system according to the third embodiment of the present invention for the electric car.
Figure 17:
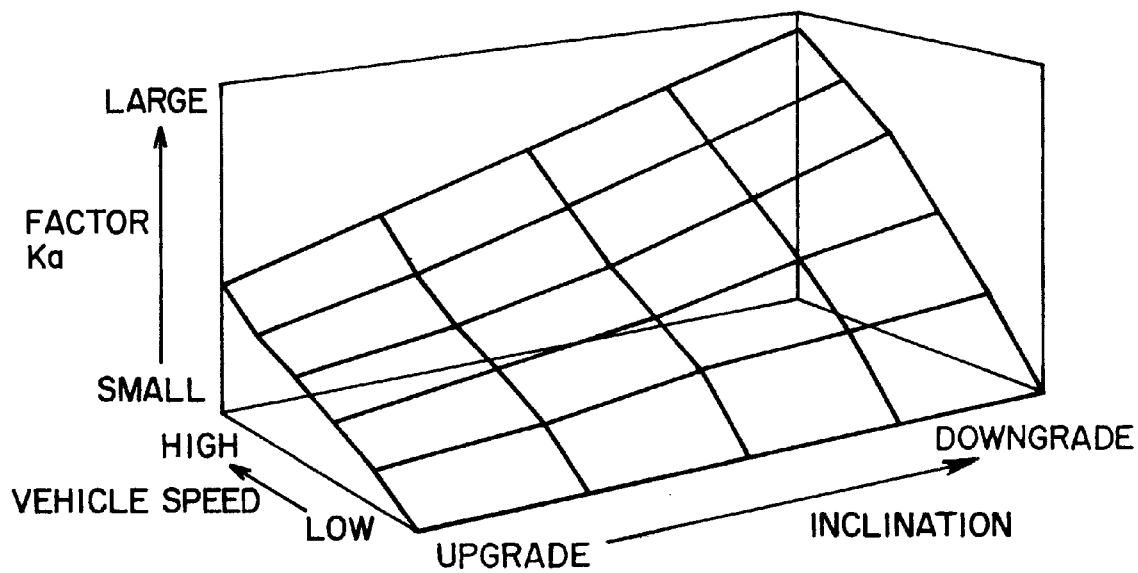
FIG. 17 is a diagram illustrating characteristics of factors for setting regeneration gains of the regenerative braking control system according to the third embodiment of the present invention for the electric car.

A description will hereinafter be made with respect to the setting of the first factor Ka and the second factor Kaθ. In the storage unit 8, maps (factor-setting tables) such as those shown in FIG. 16 and FIG. 17 are stored. If both the brake and the accelerator are not determined to have been operated by the determination unit 9 on the basis of detection information from the vehicle operation detecting unit 100, the gain setting unit 121 reads the first factor Ka and the second factor Kaθ and sets the regeneration gain K.

Here, this first factor Ka is set corresponding to steering angle information from the steering angle sensor 25. As illustrated in FIG. 16, the first factor Ka is basically set smaller as the steering angle becomes greater.

This setting was adopted in view of the possibility that, if an excessively large regeneration gain is given during steering, the positional stability of the vehicle would be impaired.

On the other hand, the second factor $Ka\theta$ is set in accordance with a three-dimensional map such as that shown in FIG. 17 on the basis of vehicle speed information and gradient information available from the vehicle speed sensor 24 and the inclination detecting unit 28, respectively.

In this three-dimensional map, as is illustrated in the drawing, the second factor $Ka\theta$ is set greater as the vehicle speed becomes higher and the second factor $Ka\theta$ is also set greater as the grade becomes smaller (namely, the downgrade becomes greater).

Incidentally, it is necessary to make the regeneration-gain-setting factor greater when the vehicle speed is high. An actually-produced regenerative torque is however not completely consistent with the tendency shown in FIG. 17. This is attributed to the characteristics of the motor 2 that no large torque is generally produced in a high rpm range. When drive force of the motor 2 is transmitted to the driving wheels 4 via the transmission 3, the rpm of the motor 2 varies depending on the speed change ratio even at the same vehicle speed, resulting in a variation in the torque to be produced.

When the first factor $Ka$ and the second factor $Ka\theta$ are set as described above, the product of these factors $Ka$, $Ka\theta$ is set as the regeneration gain $K$ in accordance with the equation (3.1) at the gain setting unit 121.

Incidentally, the regeneration gain $K$, set as described above, is subjected to the following correction in accordance with detection information from the vehicle operation detection unit 100.

If it is determined, by the vehicle operation detecting unit 100, that the accelerator is operated during moderate regenerative braking (while the accelerator is off and the brake is also off), the generation gain $K$ is decreased by a predetermined amount to perform a correction so that the regenerative braking force of the motor 2 is decreased.

Namely, when the accelerator is additionally operated during moderate regenerative braking, regenerative braking force greater than that required by the driver is produced. In such a case, the moderate braking force is decreased as described above.

If it is determined by the vehicle operation detecting unit 100 during moderate regenerative braking that the brake has been operated, a correction is performed to increase the regeneration gain $K$ by a predetermined amount so that the regenerative braking force of the motor 2 is increased.

Namely, when the brake is additionally operated during moderate regenerative braking, regenerative braking force which is actually obtained is smaller than that required by the driver. In such a case, the moderate braking force is increased as described above.

Such a correction of the regeneration gain $K$ is effected by correcting at least one of the first factor $Ka$ and the second factor $Ka\theta$. In practice, the correction of the gain $K$ is performed by rewriting the maps shown in FIG. 16 and FIG. 17, in other words, by updating the memory. Described specifically, when it is desired, for example, to decrease the correction gain $K$, rewriting of the maps shown in FIG. 16 and FIG. 17 is performed by multiplying the factors $Ka, Ka\theta$, which have been obtained from the maps, by a predetermined value (for example, 0.98 or so).

In some instances, however, it may not be possible to set, by such a correction alone, moderate regenerative braking force which fully reflects the driver's preference in driving and road conditions. The present system is therefore designed to prohibit any correction of the regeneration gain $K$, the correction being performed by rewriting the maps, when one of the following operation situations is determined from detection information from the brake pedal stroke detection unit 21, the accelerator pedal stroke detection unit 22 and the steering angle sensor 25:

(1) Subsequent to the occurrence of moderate regenerative braking by release of the accelerator pedal and release of brake pedal, the brake pedal was operated and the vehicle speed has then dropped substantially.

(2) Subsequent to the occurrence of moderate regenerative braking by release of the accelerator pedal and release of brake pedal, the brake pedal was operated and the steering angle has then changed substantially.

(3) Subsequent to the occurrence of moderate regenerative braking by release of the accelerator pedal and release of brake pedal, an operation of the accelerator pedal has continued for a predetermined period or longer.

(4) Subsequent to the occurrence of moderate regenerative braking by release of the accelerator pedal and release of brake pedal, an operation of the accelerator pedal and an operation of the brake pedal have been repeated frequently at short intervals.

The operation situation (1) includes, for example, such a case that the driver has operated the brake pedal because of a deceleration of a vehicle running ahead of his vehicle, a deceleration during jamming, or a deceleration, stopping or the like for a traffic light. Since there is not much necessity for performing a correction of the regeneration gain in such a case, correction of the regeneration gain is prohibited.

As the operation situation (2), it is possible to imagine an operation of the brake pedal for a deceleration before a curve. Because the deceleration is by the driver's intention in this case, correction of the regeneration gain is prohibited.

In the case of the operation situation (3), on the other hand, the braking force of moderate regenerative braking is not insufficient but the driver desires a re-acceleration. In such a case, correction of the regeneration gain is also prohibited.

The operation situation (4) indicates such a case that running and-stopping are repeated, for example, on a jammed road. Because it is also unnecessary to correct the gain of the moderate regenerative braking in such a case, correction of the regeneration gain is prohibited.

By subjecting the regeneration gain $K$ to correction or, when such a specific operation situation is determined, by prohibiting correction of the regeneration gain $K$, it is possible to set a regeneration gain $K$ compatible with the driver's preference and road conditions. This makes it possible to set braking force which does not give incongruousness to the driver.

Further, the regenerative braking force calculation unit 12 sends the regeneration gain $K$, which has been obtained as described above, to the command unit 11 via the lowpass filter 15. By the command unit 11, the motor 2 is controlled so that regenerative braking force is obtained corresponding to the regeneration gain $K$.

Figure 18:
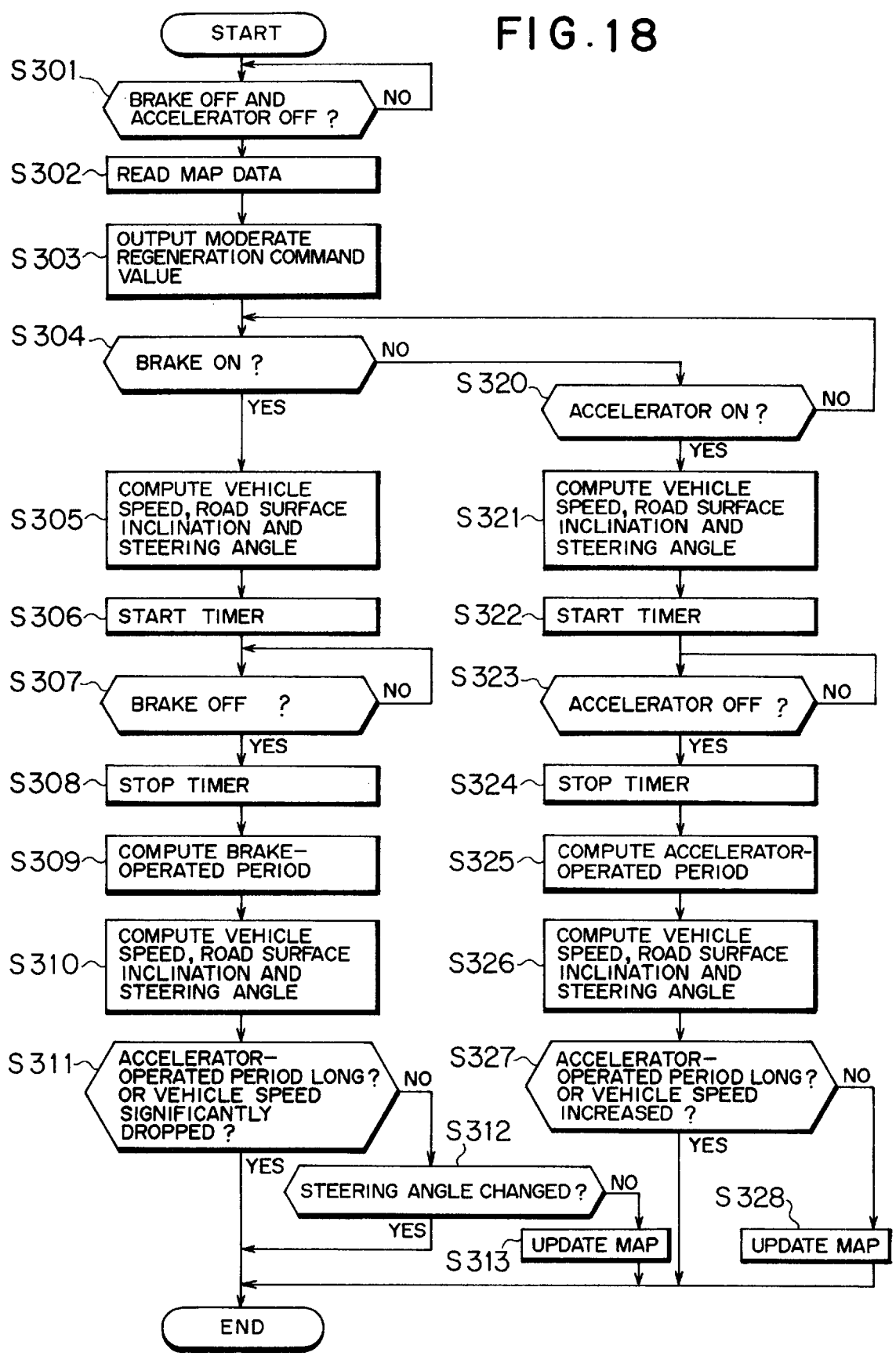
FIG. 18 is a flow chart illustrating an operation of the regenerative braking control system according to the third embodiment of the present invention for the electric car.

As the regenerative braking control system according to the third embodiment of this invention for the electric vehicle is constructed as described above, control of moderate regenerative braking force (regeneration command value) is performed at predetermined intervals, for example, in accordance with a flow chart such as that shown in FIG. 18.

Described specifically, it is first determined in step S301 whether or not the conditions of brake-off and accelerator-off are met. If these conditions are found to be met, the routine advances to step S302 onwards to perform moderate regenerative braking.

In step S302, factors Ka,Kaθ for the determination of a regeneration gain K are read from maps such as those shown in FIG. 16 and FIG. 17. In step S303, the product of these factors Ka,Kaθ is set at the regeneration gain K.

Next, it is determined in step S304 whether or not the brake pedal has been operated. If an operation of the brake pedal is detected, the routine advances to step S305. If no operation of the brake pedal is detected, the routine advances to step S320.

When the routine has advanced to step S305, a vehicle speed, a road surface inclination and a steering angle are inputted, and a timer is started in step S306. In steps S307 to S309, a period until the brake pedal is released is measured. In step S310, a vehicle speed, a road surface inclination and a steering angle at the time of the release of the brake pedal are inputted again.

In step S311 onwards, the regeneration gain is subjected to a correction if based on the results of step S310, the moderate regenerative braking force is determined to require a correction. This correction is however prohibited if it is unnecessary to correct the moderate regenerative braking force.

Namely, if neither an operation of the brake pedal for the predetermined period nor a substantial drop in vehicle speed is determined in step S311 and if no significant change in steering angle is determined in step S313, the values of the above-described maps are rewritten to correct the regeneration gain K. Specifically, the maps are rewritten to make the values of the factors Ka, Kaθ greater so that a correction is performed to increase the regenerative braking force.

If any one of an operation of the brake pedal for the predetermined period, a substantial drop in vehicle speed and a significant change in steering angle is detected in step S311 or step S312, such a correction of the regeneration gain K is not performed, and the regenerative braking force is set in accordance with the regeneration gain K set in step S303.

If no operation of the brake pedal is detected in step S304, on the other hand, the routine advances to step S320, where it is determined whether or not the accelerator pedal has been operated. If the accelerator pedal is found to have been operated, a vehicle speed, a road surface inclination and a steering angle are inputted in step S321 and the timer is then started in step S322. Further, in step S323 to S325, a period until the accelerator pedal is released is measured. In step S326, a vehicle speed, a road surface inclination and a steering angle at the time of the release of the accelerator pedal are inputted again.

In step S327 onwards, the regeneration gain K is subjected to a correction if, based on the results of step S325 and S326, the moderate regenerative braking force is determined to require a correction. This correction is however prohibited if it is unnecessary to correct the moderate regenerative braking force.

Namely, if neither an operation of the accelerator pedal for the predetermined period nor a substantial increase in vehicle speed is determined in step S327, the values of the above-described maps for setting the factors Ka,Kaθ are rewritten in step S328 to correct the regeneration gain K. Specifically, such a correction is performed by rewriting the values of the maps to make the values of the factors Ka, Kaθ smaller so that a correction is performed to decrease the regenerative braking force.

By setting the moderate regenerative braking in accordance with the three running conditions of a vehicle speed, a steering angle and a road surface inclination as described above, it is possible to set moderate regenerative braking force compatible with the driver's preference and road conditions. During an application of moderate regenerative braking, incongruousness-free feeling can therefore be obtained.

Further, the above control can reduce the frequency of operations of the brake pedal and also the frequency of operations of the accelerator pedal. Owing to such reductions in the frequency of operations of the brake pedal and the frequency of operations of the accelerator pedal, the efficiency of regeneration is improved so that the distance covetable per charging of the electric car can be increased.

In the above-described embodiment, the first factor Ka was set from a steering angle and the second factor Kaθ was set based on a vehicle speed and an inclination. As an alternative, it may also be possible to set a first factor Ka' from a vehicle speed and to set a second factor kaθ' on the basis of a steering angle and an inclination and then set the product of these factors Ka', Ka' as a regeneration gain K. Namely, it may be possible to modify the two-dimensional map of FIG. 16 into such a map as permitting the setting of the first factor Ka' from a vehicle speed and also to modify the three-dimensional map of FIG. 17 into such a map as permitting the setting of the second factor kaθ' from a steering angle and an inclination.

CAPABILITY OF EXPLOITATION IN INDUSTRY

An application of the present invention to an electric vehicle, which runs by driving wheels with an electric motor, makes it possible to control moderate regenerative braking, which is equivalent to an engine brake of an automotive vehicle equipped with an internal combustion engine, in accordance with the driver's preference and road conditions. As a result, feeling during moderate regenerative braking of the electric vehicle is improved and in addition, the efficiency of regeneration is also improved so that the distance covetable per charging is also increased. Accordingly, the present invention contributes to improvements in the drivability and running performance of such an electric vehicle, and is considered to have extremely high utility.

What is claimed is:

1. A regenerative braking control system for an electric vehicle, comprising:
    an electric energy supply source mounted on said vehicle;
    an electric motor electrically connected to said electric energy supply source and having a power output shaft connected to a driving wheel of said vehicle;
    a driving state detection unit including an inclination detecting unit for detecting an inclination of said vehicle in running; and
    a control unit for controlling regenerative braking force of said electric motor on a basis of detection information from said inclination detecting unit of said driving state detection unit wherein said control unit is provided with a storage unit for determining the regenerative braking force of said electric motor at least in accordance with said detection information from said inclination detecting unit, and said control unit obtains, from said storage unit, a signal indicative of said regeneration braking force that corresponds to said detection information, and controls the regenerative braking based on said obtained signal.

2. The system of claim 1, wherein said control unit controls said electric motor to increase regenerative braking force when said vehicle is determined to be running on a descent hill on the basis of detection information from said inclination detecting unit, and controls said electric motor to decrease regenerative braking force when said vehicle is determined to be running on an ascent hill on the basis of detection information from said inclination detecting unit.

3. The system of claim 1, wherein said control unit performs said control to produce regenerative braking force of the same strength as that produced upon running on a level road when said vehicle is determined to be running on a road of a grade in a predetermined grade range close to that of said level road on the basis of detection information from said inclination detecting unit.

4. The system of claim 1, wherein said control unit performs said control so that a decrease or increase in said regenerative braking force produced at said electric motor is limited when said inclination is detected to be an upward inclination or downward inclination of a predetermined value.

5. The system of claim 1, wherein said driving state detection unit is provided with a brake operation detecting unit for detecting an operated state of a brake of said vehicle and also with a revolution speed detection unit for detecting a revolution speed of said electric motor; and said control unit is provided with a regenerative braking force calculation unit, which includes a base computing unit for computing base regenerative braking force on a basis of respective detection information from said brake operation detecting unit and said revolution speed detection unit, and also with a correction computing unit for correcting said base regenerative braking force, which has been computed by said base computing unit, on a basis of said inclination of said vehicle in running, whereby based on a preset value of regenerative braking force calculated by said regenerative force calculation unit, regenerative braking force of said electric motor is controlled.

6. The system of claim 5, wherein, when said vehicle is determined to be running on a road of a grade in a predetermined grade range close to that of a level load on the basis of detection information from said inclination detecting unit, said regenerative braking force calculation unit performs said control so that said base regenerative braking force is used as said preset value of regenerative braking force.

7. The system of claim 5, wherein said control unit is provided with a device for preventing said preset value of regenerative braking force, which has been outputted to an output terminal of said regenerative braking force calculation unit, from varying abruptly.

8. The system of claim 1, wherein said inclination detecting unit calculates said inclination on a basis of running resistance obtained by subtracting acceleration resistance from driving force or braking force produced at said driving wheel.

9. The system of claim 1, wherein said driving state detection unit is provided with an acceleration or deceleration detecting unit for detecting an acceleration or deceleration of said vehicle, and when a state in which said acceleration or deceleration of said vehicle detected by said acceleration or deceleration detecting unit exceeds a preset acceleration or deceleration limit value continues for at least a predetermined period, said control unit performs said control by using, as said detection information from said inclination detecting unit, an inclination of said vehicle immediately before said acceleration deceleration of said vehicle has exceeded said acceleration deceleration limit.

10. The system of claim 9, wherein said driving state detection unit is provided with a vehicle speed detection unit for detecting a speed of said vehicle, and when a state in which a deceleration of said vehicle detected by said acceleration/deceleration detection unit exceeds a preset deceleration limit value continues for at least a predetermined period, said control unit decreases regenerative braking force of said electric motor and then performs said control by using, as detection information from said inclination detecting unit, an inclination of said vehicle immediately before said deceleration of said vehicle has exceeded said deceleration limit value; and subsequently, when a state in which a vehicle speed detected by said vehicle speed detection unit is not higher than a preset vehicle speed base value continues for at least a predetermined base period, said control unit performs said control by using, as a current inclination of said vehicle, detection information from said inclination detecting unit.

11. The system of claim 9, wherein, when a state in which an acceleration of said vehicle detected by said acceleration/deceleration detection unit exceeds a preset acceleration limit value continues for at least a predetermined period, said control unit performs said control by using, as detection information from said inclination detecting unit, an inclination of said vehicle immediately before said acceleration of said vehicle has exceeded said acceleration limit value; and subsequently, when a state in which an acceleration of said vehicle is not higher than a preset acceleration base value continues for at least a predetermined base period, said control unit performs said control by using, as a current inclination of said vehicle, detection information from said inclination detecting unit.

12. The system of claim 1, wherein said control unit is provided with a road conditions determining unit for determining conditions of a road, on which said vehicle is running, on a basis of detection results from said driving state detection unit, and said control unit controls said regenerative braking force of said electric motor on a basis of detection results from said inclination detecting unit and determined information from a road conditions determining unit.

13. The system of claim 12, wherein said driving state detection unit is provided with a vehicle speed detection unit for detecting a vehicle speed of said vehicle and a steering angle detection unit for detecting a steering angle of said vehicle, and said road conditions determining unit determines a kind of said road, on which said vehicle is running, on a basis of said vehicle speed detected by said vehicle speed detection unit and said steering angle detected by said steering angle detection unit.

14. The system of claim 1, wherein said control unit is provided with driving characteristics determination unit for determining driving characteristics of a driver of said vehicle on a basis of detection results of said driving state detection unit, and said control unit controls said regenerative braking force of said electric motor on a basis of detection results from said inclination detecting unit and determined information from said driving characteristics determination unit.

15. The system of claim 14, wherein said driving state detection unit is provided with an accelerator pedal stroke detection unit for detecting a stroke of an accelerator pedal of said vehicle and also with a brake operation detecting unit for detecting an operated state of a brake of said vehicle, and said driving characteristics determining unit determines said driving characteristics on a basis of said accelerator pedal stroke detected by said accelerator pedal stroke detection unit and said operated state of said brake detected by said brake operation detecting unit.

16. The system of claim 1, wherein said control unit is provided with a road conditions determining unit for determining conditions of a road, on which said vehicle is running, on a basis of detection results of said driving state detection unit and also with a driving characteristics determination unit for determining driving characteristics of a driver of said vehicle on a basis of said detection results of said driving state detection unit, and said control unit controls said regenerative braking force of said electric motor on a basis of detection results from said inclination detection unit and respective determined information of said road conditions determining unit and said driving characteristics determination unit.

17. The system of claim 1, wherein said control unit performs said control such that said regenerative braking force of said electric motor becomes equal to said regenerative braking force read from said storage unit.

18. The system of claim 1, wherein said driving state detection unit is provided with vehicle operation detecting unit for detecting an operated state of said vehicle by a driver of said vehicle, and said control unit is provided with a storage unit for determining the regenerative braking force of said electric motor in accordance with detection results at said inclination detecting unit, said control unit reads from said storage unit said regenerative braking force corresponding to said detection results, and then performs said control so that said regenerative braking force of said electric motor becomes equal to said regenerative braking force read from said storage unit, and said control unit corrects said control of said regenerative braking force on a basis of detection results form said vehicle operation detecting unit.

19. The system of claim 18, wherein said operated state detection unit is provided with at least one of a vehicle speed detection unit for detecting a vehicle speed of said vehicle and a turning state detection unit for detecting a turning state of said vehicle, and said control unit is provided with a storage unit for determining said regenerative braking force of said electric motor in accordance with detection results at at least one of said vehicle speed detection unit and said turning state detection unit and also at said inclination detecting unit, and said control unit reads from said storage unit said regenerative braking force corresponding to said detection results, and then performs said control so that said regenerative braking force of said electric motor becomes equal to said regenerative braking force read from said storage unit.

20. The system of claim 18, wherein said vehicle operation detecting unit is provided with an accelerator pedal stroke detection unit for detecting an operation of an accelerator of said vehicle and also with a brake operation detecting unit for detecting an operation of a brake of said vehicle, and said control unit corrects a base control value for said regenerative braking force of said electric motor so that said regenerative braking force of said electric motor is decreased upon determination of an operation of said accelerator on a basis of detection results from said inclination detecting unit, said accelerator pedal stroke detection unit and said brake operation detecting unit under regenerative braking in which neither said accelerator nor said brake is operated and that said regenerative braking force of said electric motor is increased upon determination of an operation of said brake on a basis of detection results from said inclination detecting unit, said accelerator pedal stroke detection unit and said brake operation detecting unit under regenerative braking in which neither said accelerator nor said brake is operated.

* * * * *